US008326627B2

(12) United States Patent
Kennewick et al.

(10) Patent No.: US 8,326,627 B2
(45) Date of Patent: Dec. 4, 2012

(54) SYSTEM AND METHOD FOR DYNAMICALLY GENERATING A RECOGNITION GRAMMAR IN AN INTEGRATED VOICE NAVIGATION SERVICES ENVIRONMENT

(75) Inventors: Michael R. Kennewick, Bellevue, WA (US); Catherine Cheung, Sammamish, WA (US); Larry Baldwin, Maple Valley, WA (US); Ari Salomon, Mercer Island, WA (US); Michael Tjalve, Bellevue, WA (US); Sheetal Guttigoli, Kirkland, WA (US); Lynn Armstrong, Woodinville, WA (US); Philippe DiChristo, Bellevue, WA (US); Bernie Zimmerman, Seattle, WA (US); Sam Menaker, Bellevue, WA (US)

(73) Assignee: VoiceBox Technologies, Inc., Bellevue, WA (US)

( * ) Notice: Subject to any disclaimer, the term of this patent is extended or adjusted under 35 U.S.C. 154(b) by 0 days.

(21) Appl. No.: 13/341,479

(22) Filed: Dec. 30, 2011

(65) Prior Publication Data
US 2012/0101809 A1 Apr. 26, 2012

Related U.S. Application Data

(62) Division of application No. 11/954,064, filed on Dec. 11, 2007, now Pat. No. 8,140,335.

(51) Int. Cl.
*G10L 15/00* (2006.01)
(52) U.S. Cl. .............................. 704/257; 704/9; 704/255
(58) Field of Classification Search .................. 704/247, 704/251, 255, 257, 1–10, 231, 235, 270, 704/270.1
See application file for complete search history.

(56) References Cited

U.S. PATENT DOCUMENTS

| 4,430,669 | A | 2/1984 | Cheung | 358/122 |
| 5,027,406 | A | 6/1991 | Roberts et al. | 381/43 |
| 5,155,743 | A | 10/1992 | Jacobs | 375/28 |
| 5,208,748 | A | 5/1993 | Flores et al. | 364/419 |
| 5,274,560 | A | 12/1993 | LaRue | 364/444 |
| 5,357,596 | A | 10/1994 | Takebayashi et al. | 395/2.84 |

(Continued)

FOREIGN PATENT DOCUMENTS

EP 1 320 043 A2 6/2003

(Continued)

OTHER PUBLICATIONS

Reuters, "IBM to Enable Honda Drivers to Talk to Cars", Charles Schwab & Co., Inc., Jul. 28, 2002, 1 page.

(Continued)

*Primary Examiner* — Huyen X. Vo
(74) *Attorney, Agent, or Firm* — Pillsbury Winthrop Shaw Pittman LLP

(57) ABSTRACT

The system and method described herein may dynamically generate a recognition grammar associated with a conversational voice user interface in an integrated voice navigation services environment. In particular, in response to receiving a natural language utterance that relates to a navigation context at the voice user interface, a conversational language processor may generate a dynamic recognition grammar that organizes grammar information based on one or more topological domains. For example, the one or more topological domains may be determined based on a current location associated with a navigation device, whereby a speech recognition engine may use the grammar information organized in the dynamic recognition grammar according to the one or more topological domains to generate one or more interpretations associated with the natural language utterance.

32 Claims, 6 Drawing Sheets

U.S. PATENT DOCUMENTS

| | | | |
|---|---|---|---|
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |
| 5,475,733 A | 12/1995 | Eisdorfer et al. | 379/52 |
| 5,488,652 A | 1/1996 | Bielby et al. | 379/88 |
| 5,499,289 A | 3/1996 | Bruno et al. | 379/220 |
| 5,500,920 A | 3/1996 | Kupiec | 395/2.79 |
| 5,517,560 A | 5/1996 | Greenspan | 379/114 |
| 5,533,108 A | 7/1996 | Harris et al. | 379/201 |
| 5,537,436 A | 7/1996 | Bottoms et al. | 375/222 |
| 5,539,744 A | 7/1996 | Chu et al. | 370/60 |
| 5,557,667 A | 9/1996 | Bruno et al. | 379/201 |
| 5,563,937 A | 10/1996 | Bruno et al. | 379/201 |
| 5,577,165 A | 11/1996 | Takebayashi et al. | 395/2.84 |
| 5,590,039 A | 12/1996 | Ikeda et al. | 395/759 |
| 5,608,635 A | 3/1997 | Tamai | 364/449.3 |
| 5,617,407 A | 4/1997 | Bareis | 369/275.3 |
| 5,633,922 A | 5/1997 | August et al. | 379/220 |
| 5,675,629 A | 10/1997 | Raffel et al. | 379/58 |
| 5,696,965 A | 12/1997 | Dedrick | 395/610 |
| 5,708,422 A | 1/1998 | Blonder et al. | 340/825.34 |
| 5,721,938 A | 2/1998 | Stuckey | 395/754 |
| 5,722,084 A | 2/1998 | Chakrin et al. | 455/551 |
| 5,740,256 A | 4/1998 | Castello Da Costa et al. | 361/94.7 |
| 5,742,763 A | 4/1998 | Jones | 395/200.3 |
| 5,748,841 A | 5/1998 | Morin et al. | 395/2.66 |
| 5,748,974 A | 5/1998 | Johnson | 395/759 |
| 5,752,052 A | 5/1998 | Richardson et al. | 395/759 |
| 5,754,784 A | 5/1998 | Garland et al. | 395/200.49 |
| 5,761,631 A | 6/1998 | Nasukawa | 704/9 |
| 5,774,859 A | 6/1998 | Houser et al. | 704/275 |
| 5,794,050 A | 8/1998 | Dahlgren et al. | 395/708 |
| 5,794,196 A | 8/1998 | Yegnanarayanan et al. | 704/255 |
| 5,797,112 A | 8/1998 | Komatsu et al. | 701/201 |
| 5,799,276 A | 8/1998 | Komissarchik et al. | 704/251 |
| 5,802,510 A | 9/1998 | Jones | 707/2 |
| 5,832,221 A | 11/1998 | Jones | 375/200.36 |
| 5,839,107 A | 11/1998 | Gupta et al. | 704/270 |
| 5,848,396 A | 12/1998 | Gerace | 705/10 |
| 5,867,817 A | 2/1999 | Catallo et al. | 704/255 |
| 5,878,385 A | 3/1999 | Bralich et al. | 704/9 |
| 5,878,386 A | 3/1999 | Coughlin | 704/10 |
| 5,892,813 A | 4/1999 | Morin et al. | 379/88.01 |
| 5,892,900 A | 4/1999 | Ginter et al. | 395/186 |
| 5,895,464 A | 4/1999 | Bhandari et al. | 707/3 |
| 5,895,466 A | 4/1999 | Goldberg et al. | 707/5 |
| 5,897,613 A | 4/1999 | Chan | 704/210 |
| 5,902,347 A | 5/1999 | Backman et al. | 701/200 |
| 5,911,120 A | 6/1999 | Jarett et al. | 455/417 |
| 5,918,222 A | 6/1999 | Fukui et al. | 707/1 |
| 5,926,784 A | 7/1999 | Richardson et al. | 704/9 |
| 5,933,822 A | 8/1999 | Braden-Harder et al. | 707/5 |
| 5,953,393 A | 9/1999 | Culbreth et al. | 379/88.25 |
| 5,960,397 A | 9/1999 | Rahim | 704/244 |
| 5,960,399 A | 9/1999 | Barclay et al. | 704/270 |
| 5,960,447 A | 9/1999 | Holt et al. | 707/500 |
| 5,963,894 A | 10/1999 | Richardson et al. | 704/9 |
| 5,963,940 A | 10/1999 | Liddy et al. | 707/5 |
| 5,987,404 A | 11/1999 | Della Pietra et al. | 704/9 |
| 5,991,721 A | 11/1999 | Asano et al. | 704/257 |
| 5,995,119 A | 11/1999 | Cosatto et al. | 345/473 |
| 5,995,928 A | 11/1999 | Nguyen et al. | 704/251 |
| 6,009,382 A | 12/1999 | Martino et al. | 704/1 |
| 6,014,559 A | 1/2000 | Amin | 455/413 |
| 6,018,708 A | 1/2000 | Dahan et al. | 704/244 |
| 6,021,384 A | 2/2000 | Gorin et al. | 704/1 |
| 6,035,267 A | 3/2000 | Watanabe et al. | 704/1 |
| 6,044,347 A | 3/2000 | Abella et al. | 704/272 |
| 6,049,602 A | 4/2000 | Foladare et al. | 379/265 |
| 6,049,607 A | 4/2000 | Marash et al. | 379/410 |
| 6,058,187 A | 5/2000 | Chen | 380/21 |
| 6,067,513 A | 5/2000 | Ishimitsu | 704/233 |
| 6,076,059 A | 6/2000 | Glickman et al. | 704/260 |
| 6,078,886 A | 6/2000 | Dragosh et al. | 704/270 |
| 6,081,774 A | 6/2000 | De Hita et al. | 704/9 |
| 6,085,186 A | 7/2000 | Christianson et al. | 707/3 |
| 6,101,241 A | 8/2000 | Boyce et al. | 379/88.01 |
| 6,108,631 A | 8/2000 | Ruhl | 704/270 |
| 6,119,087 A | 9/2000 | Kuhn et al. | 704/270 |
| 6,134,235 A | 10/2000 | Goldman et al. | 370/352 |
| 6,144,667 A | 11/2000 | Doshi et al. | 370/401 |
| 6,144,938 A | 11/2000 | Surace et al. | 704/257 |
| 6,154,526 A | 11/2000 | Dahlke et al. | 379/88.03 |
| 6,160,883 A | 12/2000 | Jackson et al. | 379/230 |
| 6,167,377 A | 12/2000 | Gillick et al. | 704/240 |
| 6,173,266 B1 | 1/2001 | Marx et al. | 704/270 |
| 6,173,279 B1 | 1/2001 | Levin et al. | 707/5 |
| 6,175,858 B1 | 1/2001 | Bulfer et al. | 709/206 |
| 6,185,535 B1 | 2/2001 | Hedin et al. | 704/270 |
| 6,188,982 B1 | 2/2001 | Chiang | 704/256 |
| 6,192,110 B1 | 2/2001 | Abella et al. | 379/88.01 |
| 6,192,338 B1 | 2/2001 | Haszto et al. | 704/257 |
| 6,195,634 B1 | 2/2001 | Dudemaine et al. | 704/231 |
| 6,195,651 B1 | 2/2001 | Handel et al. | 707/2 |
| 6,199,043 B1 | 3/2001 | Happ | 704/272 |
| 6,208,964 B1 | 3/2001 | Sabourin | 704/244 |
| 6,208,972 B1 | 3/2001 | Grant et al. | 704/275 |
| 6,219,346 B1 | 4/2001 | Maxemchuk | 370/338 |
| 6,219,643 B1 | 4/2001 | Cohen et al. | 704/257 |
| 6,226,612 B1 | 5/2001 | Srenger et al. | 704/256 |
| 6,233,556 B1 | 5/2001 | Teunen et al. | 704/250 |
| 6,233,559 B1 | 5/2001 | Balakrishnan | 704/275 |
| 6,233,561 B1 | 5/2001 | Junqua et al. | 704/277 |
| 6,236,968 B1 | 5/2001 | Kanevsky et al. | 704/275 |
| 6,246,981 B1 | 6/2001 | Papineni et al. | 704/235 |
| 6,246,990 B1 | 6/2001 | Happ | 704/275 |
| 6,266,636 B1 | 7/2001 | Kosaka et al. | 704/244 |
| 6,269,336 B1 | 7/2001 | Ladd et al. | 704/270 |
| 6,272,455 B1 | 8/2001 | Hoshen et al. | 704/1 |
| 6,275,231 B1 | 8/2001 | Obradovich | 345/349 |
| 6,278,968 B1 | 8/2001 | Franz et al. | 704/3 |
| 6,288,319 B1 | 9/2001 | Catona | 84/609 |
| 6,292,767 B1 | 9/2001 | Jackson et al. | 704/1 |
| 6,301,560 B1 | 10/2001 | Masters | 704/251 |
| 6,308,151 B1 | 10/2001 | Smith | 704/235 |
| 6,314,402 B1 | 11/2001 | Monaco et al. | 704/275 |
| 6,362,748 B1 | 3/2002 | Huang | 340/901 |
| 6,366,882 B1 | 4/2002 | Bijl et al. | 704/235 |
| 6,366,886 B1 | 4/2002 | Dragosh et al. | 704/270.1 |
| 6,374,214 B1 | 4/2002 | Friedland et al. | 704/235 |
| 6,377,913 B1 | 4/2002 | Coffman et al. | 704/8 |
| 6,381,535 B1 | 4/2002 | Durocher et al. | 701/202 |
| 6,385,596 B1 | 5/2002 | Wiser et al. | 705/51 |
| 6,385,646 B1 | 5/2002 | Brown et al. | 709/217 |
| 6,393,403 B1 | 5/2002 | Majaniemi | 704/275 |
| 6,393,428 B1 | 5/2002 | Miller et al. | 707/102 |
| 6,397,181 B1 | 5/2002 | Li et al. | 704/256 |
| 6,404,878 B1 | 6/2002 | Jackson et al. | 379/221.01 |
| 6,405,170 B1 | 6/2002 | Phillips et al. | 704/270 |
| 6,408,272 B1 | 6/2002 | White et al. | 704/270.1 |
| 6,411,810 B1 | 6/2002 | Maxemchuk | 455/453 |
| 6,415,257 B1 | 7/2002 | Junqua et al. | 704/275 |
| 6,418,210 B1 | 7/2002 | Sayko | 379/142.15 |
| 6,420,975 B1 | 7/2002 | DeLine et al. | 340/815.4 |
| 6,429,813 B2 | 8/2002 | Feigen | 342/357.13 |
| 6,430,285 B1 | 8/2002 | Bauer et al. | 379/265.01 |
| 6,430,531 B1 | 8/2002 | Polish | 704/257 |
| 6,434,523 B1 | 8/2002 | Monaco | 704/257 |
| 6,434,524 B1 | 8/2002 | Weber | 704/257 |
| 6,434,529 B1 | 8/2002 | Walker et al. | 704/275 |
| 6,442,522 B1 | 8/2002 | Carberry et al. | 704/257 |
| 6,446,114 B1 | 9/2002 | Bulfer et al. | 709/206 |
| 6,453,153 B1 | 9/2002 | Bowker et al. | 455/67.4 |
| 6,453,292 B2 | 9/2002 | Ramaswamy et al. | 704/235 |
| 6,456,711 B1 | 9/2002 | Cheung et al. | 379/265.09 |
| 6,456,974 B1 | 9/2002 | Baker et al. | 704/270.1 |
| 6,466,654 B1 | 10/2002 | Cooper et al. | 379/88.01 |
| 6,466,899 B1 | 10/2002 | Yano et al. | 704/1 |
| 6,470,315 B1 | 10/2002 | Netsch et al. | 704/256 |
| 6,498,797 B1 | 12/2002 | Anerousis et al. | 370/522 |
| 6,499,013 B1 | 12/2002 | Weber | 704/257 |
| 6,501,833 B2 | 12/2002 | Phillips et al. | 379/88.07 |
| 6,501,834 B1 | 12/2002 | Milewski et al. | 379/93.24 |
| 6,510,417 B1 | 1/2003 | Woods et al. | 704/275 |

| Patent No. | Date | Inventor | Class |
|---|---|---|---|
| 6,513,006 B2 | 1/2003 | Howard et al. | 704/257 |
| 6,522,746 B1 | 2/2003 | Marchok et al. | 379/406.03 |
| 6,523,061 B1 | 2/2003 | Halverson et al. | 709/202 |
| 6,532,444 B1 | 3/2003 | Weber | 704/257 |
| 6,539,348 B1 | 3/2003 | Bond et al. | 704/9 |
| 6,549,629 B2 | 4/2003 | Finn et al. | 381/92 |
| 6,553,372 B1 | 4/2003 | Brassell et al. | 707/5 |
| 6,556,970 B1 | 4/2003 | Sasaki et al. | 704/257 |
| 6,556,973 B1 | 4/2003 | Lewin | 704/277 |
| 6,560,576 B1 | 5/2003 | Cohen et al. | 704/270 |
| 6,560,590 B1 | 5/2003 | Shwe et al. | 706/55 |
| 6,567,778 B1 | 5/2003 | Chao Chang et al. | 704/257 |
| 6,567,797 B1 | 5/2003 | Schuetze et al. | 707/2 |
| 6,570,555 B1 | 5/2003 | Prevost et al. | 345/156 |
| 6,570,964 B1 | 5/2003 | Murveit et al. | 379/67.1 |
| 6,571,279 B1 | 5/2003 | Herz et al. | 709/217 |
| 6,574,597 B1 | 6/2003 | Mohri et al. | 704/251 |
| 6,574,624 B1 | 6/2003 | Johnson et al. | 707/5 |
| 6,578,022 B1 | 6/2003 | Foulger et al. | 706/45 |
| 6,581,103 B1 | 6/2003 | Dengler | 709/231 |
| 6,587,858 B1 | 7/2003 | Strazza | 707/102 |
| 6,591,239 B1 | 7/2003 | McCall et al. | 704/275 |
| 6,594,257 B1 | 7/2003 | Doshi et al. | 370/352 |
| 6,594,367 B1 | 7/2003 | Marash et al. | 381/92 |
| 6,598,018 B1 | 7/2003 | Junqua | 704/270 |
| 6,601,026 B2 | 7/2003 | Appelt et al. | 704/9 |
| 6,604,075 B1 | 8/2003 | Brown et al. | 704/270.1 |
| 6,604,077 B2 | 8/2003 | Dragosh et al. | 704/270.1 |
| 6,606,598 B1 | 8/2003 | Holthouse et al. | 704/275 |
| 6,611,692 B2 | 8/2003 | Raffel et al. | 455/552 |
| 6,614,773 B1 | 9/2003 | Maxemchuk | 370/337 |
| 6,615,172 B1 | 9/2003 | Bennett et al. | 704/257 |
| 6,622,119 B1 | 9/2003 | Ramaswamy et al. | 704/9 |
| 6,629,066 B1 | 9/2003 | Jackson et al. | 704/9 |
| 6,631,346 B1 | 10/2003 | Karaorman et al. | 704/9 |
| 6,631,351 B1 | 10/2003 | Ramachandran et al. | 704/270 |
| 6,633,846 B1 | 10/2003 | Bennett et al. | 704/257 |
| 6,643,620 B1 | 11/2003 | Contolini et al. | 704/270 |
| 6,650,747 B1 | 11/2003 | Bala et al. | 379/265.06 |
| 6,658,388 B1 | 12/2003 | Kleindienst et al. | 704/275 |
| 6,678,680 B1 | 1/2004 | Woo | 707/6 |
| 6,681,206 B1 | 1/2004 | Gorin et al. | 704/243 |
| 6,691,151 B1 | 2/2004 | Cheyer et al. | 709/202 |
| 6,701,294 B1 | 3/2004 | Ball et al. | 704/257 |
| 6,704,396 B2 | 3/2004 | Parolkar et al. | 379/88.17 |
| 6,704,708 B1 | 3/2004 | Pickering | 704/235 |
| 6,708,150 B1 | 3/2004 | Hirayama et al. | 704/243 |
| 6,721,001 B1 | 4/2004 | Berstis | 348/231.3 |
| 6,721,706 B1 | 4/2004 | Strubbe et al. | 704/275 |
| 6,735,592 B1 | 5/2004 | Neumann et al. | 707/101 |
| 6,741,931 B1 | 5/2004 | Kohut et al. | 701/209 |
| 6,742,021 B1 | 5/2004 | Halverson et al. | 709/218 |
| 6,745,161 B1 | 6/2004 | Arnold et al. | 704/7 |
| 6,751,591 B1 | 6/2004 | Gorin et al. | 704/257 |
| 6,751,612 B1 | 6/2004 | Schuetze et al. | 707/4 |
| 6,754,485 B1 | 6/2004 | Obradovich et al. | 455/414.1 |
| 6,757,544 B2 | 6/2004 | Rangarajan et al. | 455/456.1 |
| 6,757,718 B1 | 6/2004 | Halverson et al. | 709/218 |
| 6,795,808 B1 | 9/2004 | Strubbe et al. | 704/275 |
| 6,801,604 B2 | 10/2004 | Maes et al. | 379/88.17 |
| 6,801,893 B1 | 10/2004 | Backfried et al. | 704/257 |
| 6,829,603 B1 | 12/2004 | Chai et al. | 707/5 |
| 6,832,230 B1 | 12/2004 | Zilliacus et al. | 707/203 |
| 6,833,848 B1 | 12/2004 | Wolff et al. | 345/719 |
| 6,850,603 B1 | 2/2005 | Eberle et al. | 379/88.16 |
| 6,856,990 B2 | 2/2005 | Barile et al. | 707/10 |
| 6,865,481 B2 | 3/2005 | Kawazoe et al. | 701/211 |
| 6,868,380 B2 | 3/2005 | Kroeker | 704/240 |
| 6,877,001 B2 | 4/2005 | Wolf et al. | 707/3 |
| 6,877,134 B1 | 4/2005 | Fuller et al. | 715/500.1 |
| 6,901,366 B1 | 5/2005 | Kuhn et al. | 704/275 |
| 6,910,003 B1 | 6/2005 | Arnold et al. | 704/4 |
| 6,912,498 B2 | 6/2005 | Stevens et al. | 704/235 |
| 6,934,756 B2 | 8/2005 | Maes | 709/227 |
| 6,937,977 B2 | 8/2005 | Gerson | 704/201 |
| 6,944,594 B2 | 9/2005 | Busayapongchai et al. | 704/275 |
| 6,950,821 B2 | 9/2005 | Faybishenko et al. | 707/10 |
| 6,954,755 B2 | 10/2005 | Reisman | 707/10 |
| 6,959,276 B2 | 10/2005 | Droppo et al. | 704/226 |
| 6,968,311 B2 | 11/2005 | Knockeart et al. | 704/270 |
| 6,973,387 B2 | 12/2005 | Masclet et al. | 701/211 |
| 6,975,993 B1 | 12/2005 | Keiller | 704/275 |
| 6,980,092 B2 | 12/2005 | Turnbull et al. | 340/425.5 |
| 6,983,055 B2 | 1/2006 | Luo | 381/313 |
| 6,990,513 B2 | 1/2006 | Belfiore et al. | 709/203 |
| 6,996,531 B2 | 2/2006 | Korall et al. | 704/270 |
| 7,003,463 B1 | 2/2006 | Maes et al. | 704/270.1 |
| 7,016,849 B2 | 3/2006 | Arnold et al. | 704/275 |
| 7,020,609 B2 | 3/2006 | Thrift et al. | 704/270.1 |
| 7,024,364 B2 | 4/2006 | Guerra et al. | 704/270 |
| 7,027,586 B2 | 4/2006 | Bushey et al. | 379/265.09 |
| 7,027,975 B1 | 4/2006 | Pazandak et al. | 704/9 |
| 7,035,415 B2 | 4/2006 | Belt et al. | 381/92 |
| 7,043,425 B2 | 5/2006 | Pao | 704/211 |
| 7,054,817 B2 | 5/2006 | Shao | 704/270 |
| 7,058,890 B2 | 6/2006 | George et al. | 715/728 |
| 7,062,488 B1 | 6/2006 | Reisman | 707/8 |
| 7,069,220 B2 | 6/2006 | Coffman et al. | 704/275 |
| 7,072,834 B2 | 7/2006 | Zhou | 704/244 |
| 7,082,469 B2 | 7/2006 | Gold et al. | 709/231 |
| 7,092,928 B1 | 8/2006 | Elad et al. | 706/60 |
| 7,107,210 B2 | 9/2006 | Deng et al. | 704/226 |
| 7,107,218 B1 | 9/2006 | Preston | 704/270 |
| 7,110,951 B1 | 9/2006 | Lemelson et al. | 704/270 |
| 7,127,400 B2 | 10/2006 | Koch | 704/270.1 |
| 7,130,390 B2 | 10/2006 | Abburi | 379/88.17 |
| 7,136,875 B2 | 11/2006 | Anderson et al. | 707/104.1 |
| 7,137,126 B1 | 11/2006 | Coffman et al. | 719/328 |
| 7,143,037 B1 | 11/2006 | Chestnut | 704/251 |
| 7,143,039 B1 | 11/2006 | Stifelman et al. | 704/270 |
| 7,146,319 B2 | 12/2006 | Hunt | 704/254 |
| 7,165,028 B2 | 1/2007 | Gong | 704/233 |
| 7,184,957 B2 | 2/2007 | Brookes et al. | 704/246 |
| 7,190,770 B2 | 3/2007 | Ando et al. | 379/88.01 |
| 7,197,069 B2 | 3/2007 | Agazzi et al. | 375/233 |
| 7,203,644 B2 | 4/2007 | Anderson et al. | 704/246 |
| 7,206,418 B2 | 4/2007 | Yang et al. | 381/92 |
| 7,207,011 B2 | 4/2007 | Mulvey et al. | 715/812 |
| 7,228,276 B2 | 6/2007 | Omote et al. | 704/243 |
| 7,231,343 B1 | 6/2007 | Treadgold et al. | 704/9 |
| 7,236,923 B1 | 6/2007 | Gupta | 704/9 |
| 7,272,212 B2 | 9/2007 | Eberle et al. | 379/88.17 |
| 7,277,854 B2 | 10/2007 | Bennett et al. | 704/257 |
| 7,283,829 B2 | 10/2007 | Christenson et al. | 455/461 |
| 7,283,951 B2 | 10/2007 | Marchisio et al. | 704/9 |
| 7,289,606 B2 | 10/2007 | Sibal et al. | 379/52 |
| 7,299,186 B2 | 11/2007 | Kuzunuki et al. | 704/270.1 |
| 7,301,093 B2 | 11/2007 | Sater et al. | 84/615 |
| 7,305,381 B1 | 12/2007 | Poppink et al. | 1/1 |
| 7,321,850 B2 | 1/2008 | Wakita | 704/10 |
| 7,328,155 B2 * | 2/2008 | Endo et al. | 704/251 |
| 7,337,116 B2 | 2/2008 | Charlesworth et al. | 704/254 |
| 7,340,040 B1 | 3/2008 | Saylor et al. | 379/67.1 |
| 7,366,285 B2 | 4/2008 | Parolkar et al. | 379/88.17 |
| 7,366,669 B2 | 4/2008 | Nishitani et al. | 704/256 |
| 7,376,645 B2 | 5/2008 | Bernard | 707/3 |
| 7,386,443 B1 | 6/2008 | Parthasarathy et al. | 704/201 |
| 7,398,209 B2 | 7/2008 | Kennewick et al. | 704/255 |
| 7,406,421 B2 | 7/2008 | Odinak et al. | 704/275 |
| 7,415,414 B2 | 8/2008 | Azara et al. | 704/270 |
| 7,424,431 B2 | 9/2008 | Greene et al. | 704/270 |
| 7,447,635 B1 | 11/2008 | Konopka et al. | 704/275 |
| 7,454,608 B2 | 11/2008 | Gopalakrishnan et al. | 713/100 |
| 7,461,059 B2 | 12/2008 | Richardson et al. | 707/5 |
| 7,472,020 B2 | 12/2008 | Brulle-Drews | 701/211 |
| 7,472,060 B1 | 12/2008 | Gorin et al. | 704/240 |
| 7,478,036 B2 | 1/2009 | Shen et al. | 704/9 |
| 7,487,088 B1 | 2/2009 | Gorin et al. | 704/240 |
| 7,493,259 B2 | 2/2009 | Jones et al. | 704/257 |
| 7,493,559 B1 | 2/2009 | Wolff et al. | 715/727 |
| 7,502,738 B2 | 3/2009 | Kennewick et al. | 704/257 |
| 7,516,076 B2 | 4/2009 | Walker et al. | 704/275 |
| 7,529,675 B2 | 5/2009 | Maes | 704/270.1 |
| 7,536,297 B2 | 5/2009 | Byrd et al. | 704/10 |
| 7,536,374 B2 | 5/2009 | Au | 706/55 |
| 7,542,894 B2 | 6/2009 | Murata | 704/9 |
| 7,546,382 B2 | 6/2009 | Healey et al. | 709/246 |
| 7,558,730 B2 | 7/2009 | Davis et al. | 704/235 |

| | | | |
|---|---|---|---|
| 7,574,362 B2 | 8/2009 | Walker et al. ............... 704/275 |
| 7,577,244 B2 | 8/2009 | Taschereau ............ 379/218.01 |
| 7,606,708 B2 | 10/2009 | Hwang ....................... 704/257 |
| 7,620,549 B2 | 11/2009 | Di Cristo et al. ............ 704/257 |
| 7,634,409 B2 | 12/2009 | Kennewick et al. .......... 704/257 |
| 7,640,006 B2 | 12/2009 | Portman et al. ............ 455/412.1 |
| 7,640,160 B2 | 12/2009 | Di Cristo et al. ............ 704/257 |
| 7,640,272 B2 | 12/2009 | Mahajan et al. ............ 707/104.1 |
| 7,676,365 B2 | 3/2010 | Hwang et al. ............... 704/240 |
| 7,676,369 B2 | 3/2010 | Fujimoto et al. ............. 704/270 |
| 7,684,977 B2 | 3/2010 | Morikawa ................... 704/211 |
| 7,693,720 B2 | 4/2010 | Kennewick et al. .......... 704/275 |
| 7,729,916 B2 | 6/2010 | Coffman et al. ............. 704/270 |
| 7,729,918 B2 | 6/2010 | Walker et al. ............... 704/275 |
| 7,729,920 B2 | 6/2010 | Chaar et al. ................. 704/275 |
| 7,748,021 B2 | 6/2010 | Obradovich ................. 725/105 |
| 7,788,084 B2 | 8/2010 | Brun et al. ....................... 704/7 |
| 7,801,731 B2 | 9/2010 | Odinak et al. ................ 704/275 |
| 7,809,570 B2 | 10/2010 | Kennewick et al. .......... 704/257 |
| 7,818,176 B2 | 10/2010 | Freeman et al. ............. 704/270 |
| 7,831,426 B2 | 11/2010 | Bennett ....................... 704/252 |
| 7,831,433 B1 | 11/2010 | Belvin et al. ................. 704/275 |
| 7,873,519 B2 | 1/2011 | Bennett ....................... 704/257 |
| 7,873,523 B2 | 1/2011 | Potter et al. ................. 704/275 |
| 7,881,936 B2 | 2/2011 | Longe et al. ................ 704/257 |
| 7,894,849 B2 | 2/2011 | Kass et al. ................ 455/550.1 |
| 7,902,969 B2 | 3/2011 | Obradovich ................. 340/439 |
| 7,917,367 B2 | 3/2011 | Di Cristo et al. .......... 704/270.1 |
| 7,949,529 B2 | 5/2011 | Weider et al. ............... 704/270 |
| 7,949,537 B2 | 5/2011 | Walker et al. ............... 704/275 |
| 7,953,732 B2 | 5/2011 | Frank et al. ................. 707/724 |
| 7,974,875 B1 | 7/2011 | Quilici et al. ............... 705/14.4 |
| 7,983,917 B2 | 7/2011 | Kennewick et al. .......... 704/257 |
| 7,984,287 B2 | 7/2011 | Gopalakrishnan et al. ... 713/100 |
| 8,005,683 B2 | 8/2011 | Tessel et al. ................. 704/275 |
| 8,015,006 B2 | 9/2011 | Kennewick et al. .......... 704/236 |
| 8,060,367 B2 * | 11/2011 | Keaveney .................... 704/247 |
| 8,069,046 B2 | 11/2011 | Kennewick et al. .......... 704/257 |
| 8,073,681 B2 | 12/2011 | Baldwin et al. .................. 704/9 |
| 8,077,975 B2 | 12/2011 | Ma et al. ..................... 382/187 |
| 8,082,153 B2 | 12/2011 | Coffman et al. ............. 704/270 |
| 8,086,463 B2 | 12/2011 | Ativanichayaphong et al. ............................ 704/275 |
| 8,112,275 B2 | 2/2012 | Kennewick et al. .......... 704/240 |
| 8,140,327 B2 | 3/2012 | Kennewick et al. .......... 704/226 |
| 8,140,335 B2 | 3/2012 | Kennewick et al. .......... 704/257 |
| 8,145,489 B2 | 3/2012 | Freeman et al. ............. 704/257 |
| 8,150,694 B2 | 4/2012 | Kennewick et al. .......... 704/257 |
| 8,155,962 B2 | 4/2012 | Kennewick et al. .......... 704/257 |
| 8,170,867 B2 | 5/2012 | Germain ......................... 704/9 |
| 8,195,468 B2 | 6/2012 | Weider et al. ............... 704/275 |
| 8,219,599 B2 | 7/2012 | Tunstall-Pedoe ............ 707/955 |
| 8,224,652 B2 | 7/2012 | Wang et al. ................. 704/275 |
| 2001/0041980 A1 | 11/2001 | Howard et al. .............. 704/270 |
| 2001/0049601 A1 | 12/2001 | Kroeker et al. .............. 704/254 |
| 2001/0054087 A1 | 12/2001 | Flom et al. .................. 709/218 |
| 2002/0015500 A1 | 2/2002 | Belt et al. ...................... 381/66 |
| 2002/0022927 A1 | 2/2002 | Lemelson et al. ........... 701/301 |
| 2002/0029261 A1 | 3/2002 | Shibata ........................ 709/219 |
| 2002/0032752 A1 | 3/2002 | Gold et al. ................... 709/218 |
| 2002/0035501 A1 | 3/2002 | Handel et al. ................. 705/10 |
| 2002/0049805 A1 | 4/2002 | Yamada et al. .............. 709/202 |
| 2002/0065568 A1 | 5/2002 | Silfvast et al. ................. 700/94 |
| 2002/0069059 A1 | 6/2002 | Smith .......................... 704/257 |
| 2002/0069071 A1 | 6/2002 | Knockeart et al. ............ 704/275 |
| 2002/0082911 A1 | 6/2002 | Dunn et al. .................... 705/14 |
| 2002/0087525 A1 | 7/2002 | Abbott et al. ................... 707/3 |
| 2002/0120609 A1 | 8/2002 | Lang et al. ...................... 707/1 |
| 2002/0124050 A1 | 9/2002 | Middeljans .................. 709/203 |
| 2002/0133402 A1 | 9/2002 | Faber et al. .................... 705/14 |
| 2002/0138248 A1 | 9/2002 | Corston-Oliver et al. ........ 704/1 |
| 2002/0143535 A1 | 10/2002 | Kist et al. .................... 704/251 |
| 2002/0161646 A1 | 10/2002 | Gailey et al. ................... 705/14 |
| 2002/0173961 A1 | 11/2002 | Guerra ........................ 704/258 |
| 2002/0184373 A1 | 12/2002 | Maes ........................... 709/228 |
| 2002/0188602 A1 | 12/2002 | Stubler et al. .................. 707/3 |
| 2002/0198714 A1 | 12/2002 | Zhou ........................... 704/252 |
| 2003/0014261 A1 | 1/2003 | Kageyama ................... 704/275 |
| 2003/0016835 A1 | 1/2003 | Elko et al. ..................... 381/92 |
| 2003/0046346 A1 | 3/2003 | Mumick et al. .............. 709/205 |
| 2003/0064709 A1 | 4/2003 | Gailey et al. ................. 455/412 |
| 2003/0065427 A1 | 4/2003 | Funk et al. ...................... 701/1 |
| 2003/0088421 A1 | 5/2003 | Maes et al. ................ 704/270.1 |
| 2003/0097249 A1 | 5/2003 | Walker et al. ................... 704/1 |
| 2003/0110037 A1 | 6/2003 | Walker et al. ............... 704/257 |
| 2003/0112267 A1 | 6/2003 | Belrose ........................ 345/728 |
| 2003/0115062 A1 | 6/2003 | Walker et al. ............... 704/258 |
| 2003/0120493 A1 | 6/2003 | Gupta ....................... 704/270.1 |
| 2003/0135488 A1 | 7/2003 | Amir et al. ...................... 707/3 |
| 2003/0144846 A1 | 7/2003 | Denenberg et al. .......... 704/277 |
| 2003/0158731 A1 | 8/2003 | Falcon et al. ................ 704/231 |
| 2003/0161448 A1 | 8/2003 | Parolkar et al. ............ 379/88.17 |
| 2003/0182132 A1 | 9/2003 | Niemoeller ................. 704/275 |
| 2003/0204492 A1 | 10/2003 | Wolf et al. ...................... 707/3 |
| 2003/0206640 A1 | 11/2003 | Malvar et al. ................. 381/93 |
| 2003/0212550 A1 | 11/2003 | Ubale .......................... 704/215 |
| 2003/0212558 A1 | 11/2003 | Matula ........................ 704/260 |
| 2003/0212562 A1 | 11/2003 | Patel et al. ................... 704/275 |
| 2003/0225825 A1 | 12/2003 | Healey et al. ................ 709/203 |
| 2003/0236664 A1 | 12/2003 | Sharma ....................... 704/251 |
| 2004/0006475 A1 | 1/2004 | Ehlen et al. ............... 704/270.1 |
| 2004/0025115 A1 | 2/2004 | Sienel et al. ................. 715/513 |
| 2004/0044516 A1 | 3/2004 | Kennewick et al. .............. 704/5 |
| 2004/0098245 A1 | 5/2004 | Walker et al. ................... 704/1 |
| 2004/0117804 A1 | 6/2004 | Scahill et al. ................ 719/320 |
| 2004/0140989 A1 | 7/2004 | Papageorge ................. 345/700 |
| 2004/0158555 A1 | 8/2004 | Seedman et al. ................ 707/3 |
| 2004/0166832 A1 | 8/2004 | Portman et al. ............ 455/412.1 |
| 2004/0167771 A1 | 8/2004 | Duan et al. .................... 704/10 |
| 2004/0193408 A1 | 9/2004 | Hunt ........................... 704/209 |
| 2004/0193420 A1 | 9/2004 | Kennewick et al. .......... 704/257 |
| 2004/0199375 A1 | 10/2004 | Ehsani et al. .................... 704/4 |
| 2004/0205671 A1 | 10/2004 | Sukehiro et al. ............. 715/532 |
| 2004/0243417 A9 | 12/2004 | Pitts, III et al. .............. 704/276 |
| 2005/0015256 A1 | 1/2005 | Kargman ..................... 704/272 |
| 2005/0021334 A1 | 1/2005 | Iwahashi ..................... 704/240 |
| 2005/0021826 A1 | 1/2005 | Kumar ......................... 709/232 |
| 2005/0033574 A1 | 2/2005 | Kim et al. .................... 704/251 |
| 2005/0043940 A1 | 2/2005 | Elder ............................... 704/9 |
| 2005/0114116 A1 | 5/2005 | Fiedler ......................... 704/201 |
| 2005/0125232 A1 | 6/2005 | Gadd ........................ 704/270.1 |
| 2005/0137850 A1 | 6/2005 | Odell .............................. 704/4 |
| 2005/0137877 A1 | 6/2005 | Oesterling et al. ............ 704/275 |
| 2005/0143994 A1 | 6/2005 | Mori et al. ................... 704/235 |
| 2005/0216254 A1 | 9/2005 | Gupta et al. ..................... 704/9 |
| 2005/0234727 A1 | 10/2005 | Chiu ........................ 704/270.1 |
| 2005/0246174 A1 | 11/2005 | DeGolia ...................... 704/270 |
| 2005/0283752 A1 | 12/2005 | Fruchter et al. .............. 717/100 |
| 2006/0041431 A1 | 2/2006 | Maes ........................ 704/270.1 |
| 2006/0047509 A1 | 3/2006 | Ding et al. ................... 704/231 |
| 2006/0206310 A1 | 9/2006 | Ravikumar et al. .............. 704/9 |
| 2006/0217133 A1 | 9/2006 | Christenson et al. ......... 455/461 |
| 2006/0285662 A1 | 12/2006 | Yin et al. .................. 379/88.16 |
| 2007/0033005 A1 | 2/2007 | Cristo et al. ..................... 704/9 |
| 2007/0033020 A1 | 2/2007 | (Kelleher) Francois et al. ............................ 704/226 |
| 2007/0038436 A1 | 2/2007 | Cristo et al. ..................... 704/9 |
| 2007/0043574 A1 | 2/2007 | Coffman et al. ............. 704/275 |
| 2007/0043868 A1 | 2/2007 | Kumar et al. ................ 709/226 |
| 2007/0050191 A1 | 3/2007 | Weider et al. ............... 704/275 |
| 2007/0055525 A1 | 3/2007 | Kennewick et al. .......... 704/257 |
| 2007/0073544 A1 | 3/2007 | Millett et al. ................ 704/277 |
| 2007/0078708 A1 | 4/2007 | Yu et al. ........................ 705/14 |
| 2007/0078709 A1 | 4/2007 | Rajaram ........................ 705/14 |
| 2007/0118357 A1 | 5/2007 | Kasravi et al. ................. 704/10 |
| 2007/0135101 A1 | 6/2007 | Ramati et al. .............. 455/414.1 |
| 2007/0146833 A1 | 6/2007 | Satomi et al. ................ 358/537 |
| 2007/0162296 A1 | 7/2007 | Altberg et al. ................... 705/1 |
| 2007/0179778 A1 | 8/2007 | Gong et al. ..................... 704/9 |
| 2007/0186165 A1 | 8/2007 | Maislos et al. ............... 715/728 |
| 2007/0198267 A1 | 8/2007 | Jones et al. .................. 704/257 |
| 2007/0214182 A1 | 9/2007 | Rosenberg ................. 707/104.1 |
| 2007/0250901 A1 | 10/2007 | McIntire et al. ............. 725/146 |
| 2007/0265850 A1 | 11/2007 | Kennewick et al. .......... 704/257 |
| 2007/0299824 A1 | 12/2007 | Pan et al. ......................... 707/3 |
| 2008/0034032 A1 | 2/2008 | Healey et al. ................ 709/203 |
| 2008/0065386 A1 | 3/2008 | Cross et al. .................. 704/270 |
| 2008/0091406 A1 | 4/2008 | Baldwin et al. .................. 704/4 |

| | | | |
|---|---|---|---|
| 2008/0103761 A1 | 5/2008 | Printz et al. | 704/9 |
| 2008/0109285 A1 | 5/2008 | Reuther et al. | 705/7 |
| 2008/0115163 A1 | 5/2008 | Gilboa et al. | 725/34 |
| 2008/0133215 A1 | 6/2008 | Sarukkai | 704/2 |
| 2008/0140385 A1 | 6/2008 | Mahajan et al. | 704/9 |
| 2008/0147410 A1 | 6/2008 | Odinak | 704/270.1 |
| 2008/0177530 A1 | 7/2008 | Cross et al. | 704/4 |
| 2008/0189110 A1 | 8/2008 | Freeman et al. | 704/251 |
| 2008/0235023 A1 | 9/2008 | Kennewick et al. | 704/257 |
| 2008/0235027 A1 | 9/2008 | Cross | 704/270.1 |
| 2008/0319751 A1 | 12/2008 | Kennewick et al. | 704/257 |
| 2009/0052635 A1 | 2/2009 | Jones et al. | 379/88.02 |
| 2009/0067599 A1 | 3/2009 | Agarwal et al. | 379/114.21 |
| 2009/0106029 A1 | 4/2009 | DeLine et al. | 704/275 |
| 2009/0117885 A1 | 5/2009 | Roth | 455/414.3 |
| 2009/0144271 A1 | 6/2009 | Richardson et al. | 707/5 |
| 2009/0150156 A1 | 6/2009 | Kennewick et al. | 704/257 |
| 2009/0171664 A1 | 7/2009 | Kennewick et al. | 704/257 |
| 2009/0216540 A1 | 8/2009 | Tessel et al. | 704/275 |
| 2009/0271194 A1 | 10/2009 | Davis et al. | 704/235 |
| 2009/0273563 A1 | 11/2009 | Pryor | 345/157 |
| 2009/0299745 A1 | 12/2009 | Kennewick et al. | 704/257 |
| 2009/0313026 A1 | 12/2009 | Coffman et al. | 704/275 |
| 2010/0023320 A1 | 1/2010 | Di Cristo et al. | 704/9 |
| 2010/0029261 A1 | 2/2010 | Mikkelsen et al. | 455/419 |
| 2010/0036967 A1 | 2/2010 | Caine et al. | 709/236 |
| 2010/0049501 A1 | 2/2010 | Kennewick et al. | 704/9 |
| 2010/0049514 A1 | 2/2010 | Kennewick et al. | 704/233 |
| 2010/0057443 A1 | 3/2010 | Di Cristo et al. | 704/9 |
| 2010/0063880 A1 | 3/2010 | Atsmon et al. | 705/14.53 |
| 2010/0145700 A1 | 6/2010 | Kennewick et al. | 704/257 |
| 2010/0185512 A1 | 7/2010 | Borger et al. | 705/14.49 |
| 2010/0204986 A1 | 8/2010 | Kennewick et al. | 704/226 |
| 2010/0204994 A1 | 8/2010 | Kennewick et al. | 704/257 |
| 2010/0217604 A1 | 8/2010 | Baldwin et al. | 704/275 |
| 2010/0286985 A1 | 11/2010 | Kennewick et al. | 704/257 |
| 2010/0299142 A1 | 11/2010 | Freeman et al. | 704/9 |
| 2010/0312566 A1 | 12/2010 | Odinak et al. | 704/275 |
| 2011/0112827 A1 | 5/2011 | Kennewick et al. | 704/9 |
| 2011/0112921 A1 | 5/2011 | Kennewick et al. | 705/26.1 |
| 2011/0131036 A1 | 6/2011 | Di Cristo et al. | 704/9 |
| 2011/0131045 A1 | 6/2011 | Cristo et al. | 704/249 |
| 2011/0231182 A1 | 9/2011 | Weider et al. | 704/9 |
| 2011/0231188 A1 | 9/2011 | Kennewick et al. | 704/236 |
| 2012/0022857 A1 | 1/2012 | Baldwin et al. | 704/9 |
| 2012/0101810 A1 | 4/2012 | Kennewick et al. | 704/9 |
| 2012/0109753 A1 | 5/2012 | Kennewick et al. | 705/14.58 |
| 2012/0150636 A1 | 6/2012 | Freeman et al. | 705/14.49 |

FOREIGN PATENT DOCUMENTS

| | | |
|---|---|---|
| EP | 1 646 037 | 4/2006 |
| WO | WO 99/46763 | 9/1999 |
| WO | WO 00/21232 | 4/2000 |
| WO | WO 00/46792 | 8/2000 |
| WO | WO 01/78065 | 10/2001 |
| WO | WO 2004/072954 | 8/2004 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aerosp. Electron. Systems Magazine*, vol. 14, No. 9, Sep. 1999, pp. 27-32.

Zhao, Yilin, "Telematics: Safe and Fun Driving", *IEEE Intelligent Systems*, vol. 17, Issue 1, 2002, pp. 10-14.

Chai et al., "MIND: A Semantics-Based Multimodal Interpretation Framework for Conversational System", *Proceedings of the International Class Workshop on Natural, Intelligent and Effective Interaction in Multimodal Dialogue Systems*, Jun. 2002, pp. 37-46.

Cheyer et al., "Multimodal Maps: An Agent-Based Approach", International Conference on Cooperative Multimodal Communication (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.

O'Shaughnessy, Douglas, "Interacting with Computers by Voice: Automatic Speech Recognition and Synthesis", *Proceedings of the IEEE*, vol. 91, No. 9, Sep. 1, 2003, XP011100665, pp. 1272-1305.

Statement in Accordance with the Notice from the European Patent Office dated Oct. 1, 2007 Concerning Business Methods (OJ EPO Nov. 2007, 592-593), XP002456252.

* cited by examiner

SYSTEM AND METHOD FOR DYNAMICALLY GENERATING A RECOGNITION GRAMMAR IN AN INTEGRATED VOICE NAVIGATION SERVICES ENVIRONMENT

CROSS-REFERENCE TO RELATED APPLICATIONS

This application is a divisional of U.S. patent application Ser. No. 11/954,064, entitled "System and Method for Providing a Natural Language Voice User Interface in an Integrated Voice Navigation Services Environment," filed Dec. 11, 2007, and issued as U.S. Pat. No. 8,140,335 on Mar. 20, 2012, the contents of which are hereby incorporated by reference in their entirety.

FIELD OF THE INVENTION

The present invention relates to a natural language voice user interface that facilitates cooperative, conversational interactions in an integrated voice navigation services environment, and in particular, to a natural language voice user interface in which users can request navigation services using conversational, natural language queries or commands.

BACKGROUND OF THE INVENTION

As technology advances, consumer electronics tend to play increasingly significant roles in everyday life. As a result, users tend to expect greater functionality, mobility, and convenience from their electronic devices, as exemplified by modern mobile phones, navigation devices, personal digital assistants, portable media players, and other devices often providing a wealth of functionality beyond core applications. However, the greater functionality often tends to be accompanied by significant learning curves and other barriers that prevent users from fully exploiting device capabilities (e.g., features may often be buried within difficult to navigate menus or interfaces). Moreover, although increasing demand for mobility magnifies the need for simple on-the-go device interaction mechanisms, existing systems often have complex human to machine interfaces. For example, existing human to machine interfaces tend to primarily utilize various combinations of keyboards, keypads, point and click techniques, touch screen displays, or other interface mechanisms. However, these interfaces may often be unsuitable for mobile or vehicular devices (e.g., navigation devices), as they tend to be cumbersome in environments where speed of interaction and dangers of distraction pose significant issues. As such, existing systems often fall short in providing simple and intuitive interaction mechanisms, potentially inhibiting mass-market adoption for certain technologies. As such, there is an ever-growing demand for ways to exploit technology in intuitive ways.

In response to these and other problems, various existing systems have turned to voice recognition software to simplify human to machine interactions. For example, voice recognition software can enable a user to exploit applications and features of a device that may otherwise be unfamiliar, unknown, or difficult to use. However, existing voice user interfaces, when they actually work, still require significant learning on the part of the user. For example, existing voice user interfaces (e.g., command and control systems) often require users to memorize syntaxes, words, phrases, or other keywords or qualifiers in order to issue queries or commands. Similarly, when users may be uncertain of exactly what to request, or what a device may be capable of, existing systems cannot engage with the user in a productive, cooperative, natural language dialogue to resolve requests and advance conversations. Instead, many existing speech interfaces force users to use predetermined commands or keywords to communicate requests in ways that systems can understand. By contrast, cognitive research on human interaction demonstrates that a person asking a question or giving a command typically relies heavily on context and shared knowledge of an answering person. Similarly, the answering person also tends to rely on the context and shared knowledge to inform what may be an appropriate response. However, existing voice user interfaces do not adequately utilize context, shared knowledge, or other similar information to provide an environment in which users and devices can cooperate to satisfy mutual goals through conversational, natural language interaction.

Furthermore, demand for global positional systems and other navigation-enabled devices has grown significantly in recent years. Navigation devices often tend to be used while a user may be driving, on-the-go, or in other environments where having a hands-free interface provides critical advantages. For example, a user may want to avoid being distracted by looking away from the road, yet the user may also want to interact with a navigation device, for example, to calculate a route to a destination, recalculate the route in response to traffic, find a local restaurant, gas station, or other point of interest, or perform another navigation related task. In these and other instances, efficiently processing a natural language voice-based input could enable the user to interact with the navigation device in a safer, simpler, and more effective way. However, existing systems often fall short in providing an integrated, conversational, natural language voice user interface that can provide such advantages in navigation and other mobile environments.

Existing systems suffer from these and other problems.

SUMMARY OF THE INVENTION

According to various aspects of the invention, various problems associated with existing systems may be addressed by a conversational, natural language voice user interface that provides an integrated voice navigation services environment.

According to various aspects of the invention, the natural language voice user interface may resolve voice requests relating to navigation (e.g., calculating routes, identifying locations, displaying maps, etc.). The navigation application can provide a user with interactive, data-driven directions to a destination or waypoint, wherein the user can specify the destination or waypoint using free-form natural language (e.g., the user can identify full or partial destinations, including a specific address, a general vicinity, a city, a name or type of a place, a name or type of a business, a name of a person, etc.). As free form voice destination inputs may be provided in many different forms, post-processing may be performed on full or partial voice destination inputs to identify a suitable destination address for calculating a route (e.g., a closest address that makes "sense"). For example, an utterance containing a full or partial destination may be analyzed to identify one or more probable destinations (e.g., an N-best list of destinations). The N-best list may be post-processed to assign weights or rankings to the probable destinations (e.g., based on a degree of certainty that a given probable destination corresponds to an intended destination). Thus, a route may be calculated from a user's current location to a most heavily weighted one of the probable destinations in the N-best list.

Further, when a voice destination entry includes a partial destination, a final destination may be successively refined over one or more subsequent voice destination entries. The navigation application may also provide dynamic, data-driven directions or routing to a destination. For instance, the navigation application may access data associated with various user-specific and environmental data sources to provide personalized data-driven directions along a route, which can be recalculated or modified based on information taken from the data sources. As such, data may be obtained dynamically to identify alternate routes, recalculate routes, or otherwise provide routing services. Further, possible answers or responses to a given utterance may be filtered according to a current route.

According to various aspects of the invention, the natural language voice user interface may dynamically generate and/or load recognition grammars for interpreting what was said in an utterance (e.g., content of the utterance). Information contained in the dynamic recognition grammars may be used by a navigation agent, an Automatic Speech Recognizer, a context stack, or various other components in the voice user interface that use grammar information. By efficiently generating, updating, loading, extending, or otherwise building dynamic grammars based on various factors, processing bottlenecks can be avoided, conflicts can be reduced, and other aspects of interpreting an utterance using a recognition grammar can be optimized. For example, a size of a generated grammar may be constrained by an amount of resources available in a system (e.g., in embedded devices or other devices having low amounts of dynamic memory, the constrained grammar size may limit a quantity of resources to be occupied). In another example, the size of the dynamic grammar can be reduced by eliminating redundant keywords, criteria, or other information available in the context stack, the shared knowledge, or other local sources. Thus, favorability of correct interpretations may be improved by reducing perplexity in the grammar (e.g., when two or more elements may likely be confused, one or more of the elements may be eliminated to reduce confusion).

According to various aspects of the invention, the natural language voice user interface may generate dynamic recognition grammars using techniques of geographical chunking. A user's location can be determined at a given moment to determine one or more geographic proximities, which can be used to form an appropriate topological domain for the grammar. For example, the topological domains may reflect physical proximities (e.g., a distance from a current location), civil organization proximities (e.g., regions, states, cities, neighborhoods, subdivisions, localities, etc.), temporal proximities (e.g., amounts of travel time from the current location), directional proximities (e.g., based on directional travel vectors), or various combinations thereof. As a result, by mapping the user's geographic proximities to one or more topological domains, dynamic grammars may be pruned, extended, swapped in or out of memory, or otherwise generated and/or loaded to provide optimal recognition based on location, time, travel, or other factors (e.g., information may be swapped in and out of a grammar as a user moves from one area to another, ensuring that system resources utilize information presently relevant to a given location).

According to various aspects of the invention, the natural language voice user interface may include dynamic grammars formed from one or more topological domains, which may be subdivided into a plurality of tiles, which may be further subdivided into a plurality of subtiles. Thus, information used to build the dynamic grammar can be subdivided or weighed in various ways to determine what information should be included in the grammar. Moreover, geographical chunks based on physical, civil organization, temporal, directional, or other proximities may be extended into other domains in which a topological taxonomy can be placed. As a result, in addition to having relevance in navigation or other location-dependent systems, the geographical chunking techniques can be applied in other contexts or domains in which geography or location may be relevant. Further, a server operably coupled to the voice user interface may analyze various forms of information to build or refine a source of grammar information. For example, when various devices communicate with the server, information may be communicated to the server may be used to update proximities, topological domains, tiles, subtiles, peer-to-peer affinities, or other grammar information.

According to various aspects of the invention, the natural language voice user interface may calculate routes, provide dynamic data-driven directions to a destination, provide dynamic routing to a destination, perform post-processing of full or partial destination entries, or otherwise provide various voice navigation services. Further, destinations and/or routes may be identified using techniques of successive refinement for voice destination entries, wherein context, agent adaptation, and shared knowledge, among other things, can help a user to narrow down a final destination using voice commands, multi-modal commands, or various combinations thereof. However, it will be apparent that the successive refinement techniques can be applied to various tasks in which generalized approximations can be successively refined through voice or multi-modal commands to narrow down information sought by a user, including various other domains, contexts, applications, devices, or other components that employ the techniques described herein.

According to various aspects of the invention, the natural language voice user interface may enable successive refinement of a final destination by progressively narrowing the final destination. For example, successively refining the destination may be modeled after patterns of human interaction in which a route or a destination may be narrowed down or otherwise refined over a course of interaction. For example, a user may generally approximate a destination, which may result in a route being calculated along a preferred route to the approximated destination. While en route to the approximated destination, the user and the voice user interface may cooperatively refine the final destination through one or more subsequent interactions. Thus, a user may provide a full or partial destination input using free form natural language, for example, including voice commands and/or multi-modal commands. One or more interpretations of a possible destination corresponding to the voice destination input may be organized in an N-best list. The list of possible destinations may be post-processed to assign weights or ranks to one or more of the entries therein, thus determining a most likely intended destination from a full or partial voice destination input. Thus, the post-processing operation may rank or weigh possible destinations according to shared knowledge about the user, domain-specific knowledge, dialogue history, or other factors. As a result, the full or partial destination input may be analyzed to identify an address to which a route can be calculated, for example, by resolving a closest address that makes "sense" relative to the input destination. Subsequent inputs may provide additional information relating to the destination, and the weighted N-best list may be iteratively refined until the final destination can be identified through successive refinement. As a result, when a suitable final destination has been identified, the route to the final destination may be completed.

According to various aspects of the invention, the natural language voice user interface may include one or more advertising models for generating and/or detecting events relating to location dependent advertisements for navigation systems (e.g., as generated by a local or remote advertising engine, or via a data channel, or in other ways). For example, navigation systems typically include various mechanisms for determining a current location (e.g., a global positioning system, a radio frequency identification system, a system that determines location based on a distance to an identifiable wireless tower or access point, etc.). The location detection system may thus detect information associated with a radio frequency identifier over a data channel used by a marketer to provide advertisements. The marketer may broadcast the advertisement via the data channel, such that the navigation system triggers an event when within a suitable proximity of the RFIDs. Thus, information associated with the event may be filtered according to the current routing information or other contextual parameters to determine what action should be taken in response thereto. In other instances, advertisements may be uploaded to a server by one or more advertising partners, wherein the uploaded advertisements may be associated with metadata or other descriptive information that identifies a target audience, location-dependent information, or other criteria. In another example, a plurality of advertisements may be stored locally at the voice user interface, and an inferencing engine may determine appropriate circumstances in which an event should be generated to deliver one or more of the advertisements to a user. As a result, it will be apparent that advertising events may be generated in a number of ways, and may be generated and/or detected locally, remotely, by detecting RFIDs, or in other ways.

According to various aspects of the invention, the natural language voice user interface may track user interactions with delivered advertisements. In this way, affinity based models may be generated, for example, to ensure that promotions or advertisements will be delivered to a likely target audience. Thus, an event relating to a given advertisement may be generated and/or detected when shared knowledge about a user's behavior, preferences, or other characteristics match one or more criteria associated with peer-to-peer affinities associated with the advertisement. In other examples, an advertising model may include mobile pay-per-use systems, peer-to-peer local guides or recommendations, or other forms of advertising. Additionally, various aspects of the advertising model, such as the local guides and recommendations, may be generated according to a mapping applied to various topological domains. For example, certain types of advertisements may be dependent on geographic or topological characteristics, and such advertisements may be associated with a topological taxonomy based on geographical chunks. As a result, various advertising events may be generated and/or detected according to physical proximities, temporal proximities, directional proximities, civil organization proximities, or various combinations thereof.

According to various aspects of the invention, the natural language voice user interface may enable a user to provide requests (e.g., queries, commands, or other requests) to the navigation device using natural language. As such, the user and the navigation device may engage in a cooperative, conversational dialogue to resolve the request. For example, the voice user interface may use prior context, dialogue histories, domain knowledge, short and long-term shared knowledge relating to user behavior and preferences, noise tolerance, and cognitive models, among various other things, to provide an integrated environment in which users can speak conversationally, using natural language, to issue queries, commands, or other requests that can be understood and processed by a machine. Accordingly, the voice user interface may understand free form human utterances, freeing the user from restrictions relating to how commands, queries, or other types of requests should be formulated. Instead, the user can use a natural or casual manner of speaking to request various voice services in an integrated environment, in which various devices can be controlled in a conversational manner, using natural language. For example, the voice user interface may be aware of data and services associated with the navigation device, a media device, a personal computer, a personal digital assistant, a mobile phone, or various other computing devices or systems available in the environment.

According to various aspects of the invention, the natural language voice user interface may include an input mechanism that receives a voice-based input, which includes at least an utterance or verbalization spoken by a user. The input mechanism may include a suitable device or combination of devices that can receive voice-based inputs (e.g., a directional microphone, an array of microphones, or other devices that encode speech). The input mechanism can be optimized to maximize gain in a direction of a user, cancel echoes, null point noise sources, perform variable rate sampling, filter out background conversations or environmental noise, or otherwise optimize fidelity of encoded speech. As such, the input mechanism may generate encoded speech generated in a manner that tolerates noise or other factors that could otherwise interfere with interpreting speech. Further, in various implementations, the input mechanism may include one or more other (non-voice) input modalities, which can be processed and/or correlated with one or more previous, current, or subsequent utterances or other voice-based inputs. As such, a user can provide other forms of input using a touch-screen interface, a stylus/tablet interface, a keypad or keyboard, or other input interfaces, for example, to clarify utterances or provide additional information about the utterances using other input modalities. For instance, the user could touch a stylus or other pointing device to a portion of a map displayed on a touch-screen interface, while also providing an utterance relating to the touched portion (e.g., "Show me restaurants around here."). In this example, the inputs can be correlated to interpret "around here" as likely referring to the touched portion of the map, as distinct from the user's current location or some other meaning.

According to various aspects of the invention, the natural language voice user interface may include an Automatic Speech Recognizer that processes encoded speech to generate one or more preliminary interpretations of what was said in an utterance (e.g., content of the utterance). For example, the Automatic Speech Recognizer may generate the preliminary interpretations using phonetic dictation to recognize a stream of phonemes based on a dynamically adaptable recognition grammar. The dynamically adaptable recognition grammar may be based on dictionaries or phrases from various input domains (e.g., domains for languages, navigation, music, movies, weather, various temporal or geographic proximities, or various other domains). Thus, the Automatic Speech Recognizer may generate one or more interpretations of an utterance, which may be represented as a series of phonemes or syllables. The one or more interpretations can be analyzed (e.g., utilizing phonotactic rules or models of human speech) to generate an N-best list of preliminary interpretations as to what was spoken by the user. The preliminary interpretations may then be provided to a conversational language processor, which utilizes shared knowledge, contextual information, and various other sources of information to generate an intelligent hypothesis as to an actual meaning, the user's intent, or other aspects of the utterance. By formulating the hypothesis using various features and components that model everyday human-to-human conversations, the conversational language processor may generate a hypothesis as to the meaning or intent of the utterance, which can inform a process of resolving one or more requests contained in the utterance.

According to various aspects of the invention, the natural language voice user interface may include, among other things, a context tracking engine that establishes meaning for a given utterance. For example, the context tracking engine can manage competitions among one or more context-specific domain agents that establish the meaning (e.g., redistributable, adaptable engines or modules that provide functionality for a given context, domain, system, or application). The domain agents may analyze preliminary interpretations of an utterance to generate a domain-specific probable interpretation. For example, one or more of the agents may include adaptable vocabularies, concepts, available tasks, or other forms of information specific to the respective domain or context. In addition, the agents can use a voice search engine to search a network for information that may not be available within the system. The probable interpretation can be assigned a weighted ranking or score, which can be used to select a "winning" one of the agents. Thus, the winning one of the agents may be designated responsible for establishing or inferring further information (e.g., based on domain or context-specific information), updating the shared knowledge, or resolving requests in the utterance, among other things. The context tracking engine may also maintain a context stack to track conversation topics, track previously invoked agents, evaluate criteria, weigh parameters, or otherwise maintain information relating to a conversational context (e.g., the context stack may be traversed in light of recent contexts, frequently used contexts, or other information included therein to determine a most likely intent of the user). By identifying a context, or correlatively, by identifying capabilities, tasks, vocabularies, or other information within the context, the context tracking engine can provide relevant information for establishing intent in addition to phonetic clues associated with the utterance (e.g., a word with multiple possible meanings may be disambiguated based on its meaning in a given context, previous usage in a dialogue, etc.).

According to various aspects of the invention, the natural language voice user interface may utilize various forms of information to enable sharing of assumptions and expectations relating to a given utterance, conversation, or other human to machine interaction. For example, to inform decision making in the voice user interface, the voice user interface may include information sources containing short-term and long-term shared knowledge relating to user behavior, preferences, or other characteristics (e.g., short-term and long-term profiles of a specific user, global users, peer users, etc.). The short-term shared knowledge may accumulate information during a current conversation to dynamically establish awareness of a state of the voice user interface (e.g., recognition text for previous utterances, a cross-modal user interface manipulation history, a list of previously selected tasks or invoked queries, or other information). Storage of the short-term knowledge may be modeled after human interaction, such that certain information may be expired after a psychologically appropriate amount of time (e.g., to expunge stale data), whereas information with long-term significance can be added to the long-term shared knowledge (e.g., to establish persistent awareness of data likely to remain static over time). As such, the long-term shared knowledge may profile or otherwise model various characteristics, preferences, behavior, or other information relating to a user based on information accumulated over time (e.g., user-specific jargon, demographics, cognitive patterns, frequently requested tasks, favorite topics or concepts, etc.). Accordingly, the voice user interface may utilize various forms of information available via a context tracking engine, domain agents, a voice search engine, shared knowledge, internal or external databases, data associated with other devices, or other knowledge sources. As a result, a conversational type or goal associated with utterance can be identified. Based on the available information and the type or goal of the conversation, the voice user interface may attempt to resolve the utterance (e.g., by invoking an agent, which utilizes one or more applications to perform a requested task, retrieve requested information, etc.).

According to various aspects of the invention, the natural language voice user interface may generate cross-modal intelligent responses sensitive to syntax, grammar, and context, which may provide a conversational feel to system-generated responses. When available, a generated intelligent response may present results of a resolved request (e.g., feedback relating to a task, information retrieved as a result of a query, etc.). Further, the intelligent responses may be provided across modalities, for example, using various combinations of verbal and/or non-verbal outputs (e.g., information may be presented on a display device, via an audible alert, a verbalized output, another output mechanism, or, various combinations thereof). Further, verbalized components of the cross-modal response may be adapted to the user's manner of speaking (e.g., by varying tone, pace, timing, or other variables), thus creating verbal responses having natural variation and personality. The intelligent responses may also be formulated to provide an output that guides the user towards a subsequent response (e.g., a subsequent utterance) that may be more likely to be recognized. For example, when an utterance cannot be resolved because of an ambiguous context, unrecognizable words or phrases, or other factors that can result in an ambiguous or unrecognized interpretation, the intelligent response can be framed to disambiguate context or request additional information from the user to clarify a meaning of the utterance. Further, when subsequent information indicates that a given interpretation or hypothesis was incorrect, one or more previous utterances may be reinterpreted to refine context and update short-term or long-term conversational models (e.g., an utterance of "No, I meant . . . " may indicate that a previous utterance was interpreted incorrectly, in which case various previous utterances may be reinterpreted based on a correct interpretation, thus building a more accurate conversational context). As a result, the voice user interface may tolerate full or partial failure through adaptive mechanisms.

According to various aspects of the invention, the natural language voice user interface may provide voice navigation services within an agent-based architecture. The architecture may include a plurality of adaptable agents (e.g., specialized software, data, content, or other information that provide functionality, behavior, services, data, and other information in a plurality of respective contextual domains), at least one of which provides navigation services (e.g., route calculation, map control, location-sensitive information, data-driven directions, etc.). As the agents process requests, the agents may autonomously react, adapt, and otherwise reconfigure to provide optimal voice services in respective domains. For example, by building context over time (e.g., by generating short and long-term profiles of a user, conversations with the user, frequent topics or preferences, etc.), the agents may automatically combine knowledge, adapt preferences, remove conflicts, or perform other adaptations to refine or otherwise optimize an operational framework thereof. Adaptation of the agents, which include at least a navigation agent, may occur across the plurality of agents, for example, in response to various ones of the agents resolving voice-based requests. As such, the adaptation may occur autonomously as a by-product of the agents providing voice services, generating inferences, identifying affinities (e.g., among users, peers, communities, etc.), receiving updates from external sources (e.g., using an update manager), or in other ways, as will be apparent.

According to various aspects of the invention, the natural language voice user interface may include an agent-based architecture for providing voice navigation services. For example, the agent-based architecture may include one or more domain or context-specific agents, which include at least a navigation agent. The navigation agent may include, among other things, various navigation-specific content packages (e.g., dictionaries, available queries, tasks, commands, dynamic grammars, etc.), response lists (e.g., appropriate responses to commands, queries, or other requests), personality profiles (e.g., for creating a natural feel to system-generated speech), substitution lists (e.g., for substituting or transforming data into a structured form that can be understood by a target information source), or various other forms of navigation-specific information. Further, the navigation agent may be associated with pointers to local or remote data sources, parameters and operating data provided associated with other services in the architecture, or various other forms of information. For example, the data sources used by the navigation agent may include data relating to navigation, points-of-interest, traffic, events, parking, personal data, peer affinities, or various other sources of information. Further, the data sources may be populated, extended, pruned, or otherwise constructed through adaptation, analysis of various models, communication with a data service, or in other ways, as will be apparent.

According to various aspects of the invention, the natural language voice user interface may include a navigation agent, which may be coupled with various sources of information, and may make use of context, communicating with various other adaptable agents and other system components to provide voice navigation services. For example, the navigation agent may use contextual information relating to a navigation domain, including tracked topics, user locations, routes traveled, previous requests, user interface states, user behaviors, preferences, demographics, or other characteristics, or various other types of contextual information. As a result, the navigation agent may have various sources of knowledge and resources available to resolve voice navigation requests. For example, the navigation agent may generate inferences (e.g., using an inference engine) using the available knowledge and resources to apply various rules, policies, or other inferencing techniques to generate interpretations of an utterance (e.g., phonetic fuzzy matching, inductive logic, Bayesian probability analysis, monotonic or non-monotonic reasoning, etc.). As such, the navigation agent can infer keywords or criteria not explicitly provided in the utterance, determine suitable responses to subjective or indeterminate utterances, generate events, identify peer affinities, or otherwise generate inferences for resolving navigation-related requests.

According to various aspects of the invention, the natural language voice user interface may include one or more inference engines, which can generate various inferences through awareness of previous context, short-term or long-term shared knowledge, command histories, states of vehicular systems, user interface states, and various other data sources.

In various implementations, one or more of the agents may be associated with a respective inference engine that can generate inferences using domain-specific knowledge, rules, policies, or other criteria. For instance, the inference engines may identify keywords or criteria missing in an utterance, infer intended meanings, autonomously suggest available tasks, or otherwise assist an associated agent in identifying queries, commands, or other requests contained in an utterance. Moreover, when information cannot be suitably resolved using information sources associated with the navigation agent, or through generating inferences, the information may be requested from one or more other agents, other devices, network information sources (e.g., via a voice search engine), or in other ways, as will be apparent. Upon identifying the information through one or more of the other sources, the requesting agent may be adapted to make the information subsequently available. Thus, various devices, applications, systems, and other components of an architecture may cooperatively share available information and services (e.g., context, dialogue histories, shared knowledge, maps, points of interest, contact lists, user or peer affinities, dynamic grammars, available applications, command histories, etc.). Accordingly, the architecture may provide an integrated voice navigation services environment in which users can speak natural language requests relating to various available contexts, domains, applications, devices, information sources, or various combinations thereof.

According to various aspects of the invention, the natural language voice user interface may accept natural language voice-based inputs to control an electronic device that can provide navigational information, in addition to various other devices associated with an environment in which the voice user interface operates. Furthermore, various functional aspects of the voice user interface may reside at a client device, at a server, or various combinations thereof.

According to various aspects of the invention, the natural language voice user interface may support multi-modal voice inputs. Thus, a given multi-modal voice input may include at least a voice component (e.g., an utterance) in addition to one or more non-voice input components (e.g., inputs provided via a keypad, a touch-screen, a stylus/tablet combination, a mouse, a keyboard, or other input modalities). As such, the non-voice input component can provide additional information or clarification relating to the utterance, adding to an amount of input information available when processing voice. For example, the user can use other input modalities to clarify a meaning of the utterance, provide additional information about the utterance, reduce a number of device interactions needed to make a given request, or otherwise provide additional in relation to a given utterance.

According to various aspects of the invention, the natural language voice user interface may utilize various cognitive models, contextual models, user-specific models, or other models to identify queries, commands, or other requests in a voice input. For example, a given input may include information relating to one or more contextual domains, one or more of which may be invoked to interpret and/or infer keywords, concepts, or other information contained in the input. Moreover, short-term and long-term shared knowledge about a user's behavior and preferences may be used in a hybrid recognition model that also considers semantic analysis and contextual inferences. For example, certain syllables, words, phrases, requests, queries, commands, or other information may be more likely to occur in a given context. Thus, the hybrid recognition model may analyze semantic patterns to resolve what was said by an utterance, and may further rely on contextual history or other information to resolve what was meant by the utterance. The hybrid recognition model may be used in conjunction with, or independently of, a peer to peer recognition model. For example, recognition models may include awareness of global usage patterns, preferences, or other characteristics of peer users, where certain keywords, concepts, queries, commands, or other aspects of a contextual framework may employed by peer users within the context.

Other objects and advantages of the invention will be apparent based on the following drawings and detailed description.

DETAILED DESCRIPTION

Figure 1:
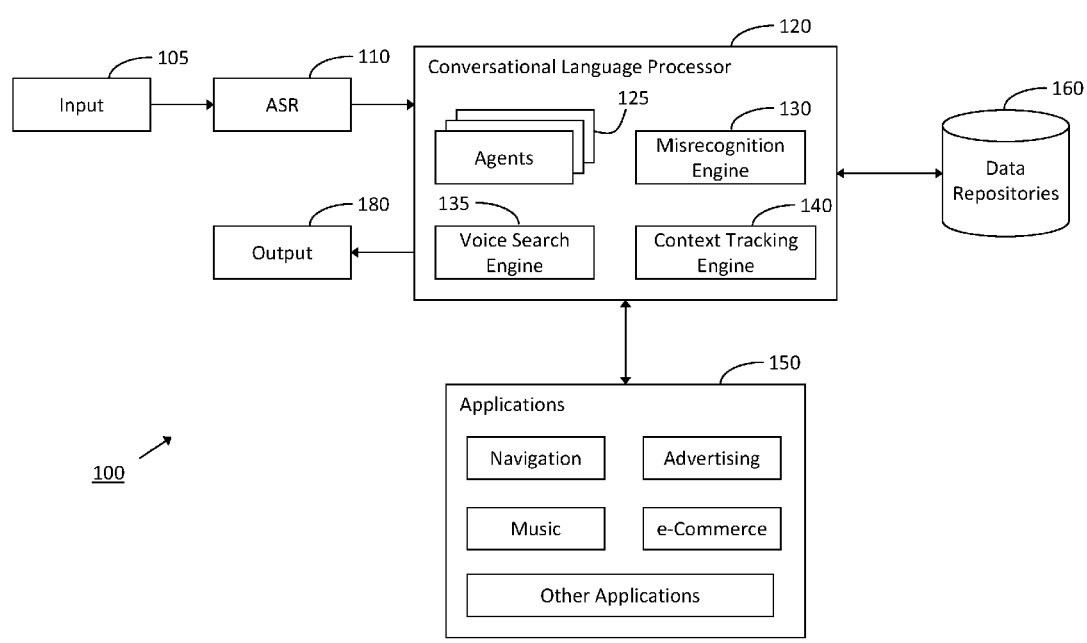
FIG. 1 illustrates a block diagram of an exemplary system for providing a navigation device with a conversational, natural language voice user interface according to various aspects of the invention.

According to various aspects of the invention, FIG. 1 illustrates a block diagram of an exemplary system 100 for providing a navigation device with a conversational, natural language voice user interface. As illustrated in FIG. 1, the system 100 may enable a user to engage in a natural language, cooperative, conversational dialogue with a voice-enabled navigation device. For example, the system 100 may understand free form human utterances, freeing the user from being restricted in how commands, queries, or other types of requests should be formulated. Instead, the user can use a casual or natural manner of speaking to request various voice navigation services, among various other voice services (e.g., services relating to telematics, communications, media, messaging, external systems, marketing, information retrieval, or various other computational services). As such, the user can use system 100 to control navigation devices, media devices, personal computers, personal digital assistants, wireless phones, or other computing devices or systems in a conversational manner, using natural language. By making use of context, prior information, domain knowledge, short and long-term shared knowledge, noise tolerance, and cognitive models, among other things, system 100 can provide an integrated environment in which users can speak conversationally, using natural language, to issue queries, commands, or other requests that can be understood and processed by a machine. For example, in various implementations, system 100 may utilize one or more techniques as described in U.S. patent application Ser. No. 10/452,147, entitled "Systems and Methods for Responding to Natural Language Speech Utterance," which issued as U.S. Pat. No. 7,398,209 on Jul. 8, 2008, and U.S. patent application Ser. No. 10/618,633, entitled "Mobile Systems and Methods for Responding to Natural Language Speech Utterance," which issued as U.S. Pat. No. 7,693,720 on Apr. 6, 2010, the contents of which are hereby incorporated by reference in their entirety.

According to various aspects of the invention, system 100 may include an input mechanism 105 that receives a voice-based input, including at least one utterance or verbalization spoken by a user. The input mechanism 105 may include a device or combination of devices suitable for receiving a voice-based input (e.g., a directional microphone, an array of microphones, or other devices that encode speech). In various implementations, the input mechanism 105 can be optimized to receive the voice-based input, for example, by maximizing gain in a direction of a user, cancelling echoes, nulling point noise sources, performing variable rate sampling, filtering out background conversations or environmental noise, or performing various other techniques for maximizing fidelity of encoded speech. As such, the encoded speech generated by input mechanism 105 may be highly tolerant of noise or other factors that may potentially interfere with interpreting human speech.

Further, in various implementations, the input mechanism 105 may be coupled to other input modalities, in that various forms of input other than voice can be processed and/or correlated with one or more previous, current, or subsequent voice-based inputs. For example, the input mechanism 105 may be coupled to a touch-screen interface, a stylus/tablet interface, a keypad or keyboard, or other devices or system interfaces, as will be apparent. As a result, an amount of input information potentially available for system 100 to process voice may be maximized, as the user can clarify utterances or provide additional information about utterances using other input modalities. For instance, the user could touch a stylus or other pointing device to a portion of a map displayed on a touch-screen interface, while also providing an utterance relating to the touched portion (e.g., "Show me restaurants around here."). In this example, system 100 may correlate the inputs to interpret "around here" as likely referring to the touched portion of the map, as distinct from the user's current location or another meaning.

System 100 may also include an Automatic Speech Recognizer 110 that receives the encoded voice input and generates one or more preliminary interpretations thereof. For example, the Automatic Speech Recognizer 110 may recognize the voice-based input using phonetic dictation to recognize a stream of phonemes based on a dynamically adaptable recognition grammar. As a result, the Automatic Speech Recognizer 110 may provide out-of-vocabulary capabilities, which may be tolerant of a user misspeaking, portions of a speech signal being dropped, or other factors that could interfere with interpreting an utterance. The dynamically adaptable recognition grammar may be based on dictionaries or phrases from various input domains (e.g., domains for different languages, navigation, music, movies, weather, various temporal or geographic proximities, or various other domains). Further, performance of the Automatic Speech Recognizer 110 may be improved, for example, by pruning a search space associated with the recognition grammar (e.g., the grammar can include a linking element, such as schwa, to represent an unstressed, central vowel that tends to be spoken frequently, even without the user's conscious awareness). Thus, using these and other techniques, Automatic Speech Recognizer 110 may analyze an incoming encoded utterance to represent portions of the utterance as a series of phonemes or syllables, which can be further broken down into core components of an onset, a nucleus, and a coda, among other subcategories. The series of phonemes or syllables can then be analyzed (e.g., utilizing phonotactic rules that model human speech) to identify a plurality of preliminary interpretations or best guesses (e.g., an N-best list) as to what was actually spoken by the user. It will be apparent, however, that the Automatic Speech Recognizer 110 may use various techniques to generate the preliminary interpretations of the encoded utterance, including those described, for example, in U.S. patent application Ser. No. 11/513,269, entitled "Dynamic Speech Sharpening," which issued as U.S. Pat. No. 7,634,409 on Dec. 15, 2009, the contents of which are hereby incorporated by reference in their entirety.

The plurality of preliminary interpretations generated by the Automatic Speech Recognizer 110 may be provided to a conversational language processor 120, which utilizes shared knowledge to generate an intelligent hypothesis of an actual meaning, a user's intent, or other aspect of the voice-based input. The conversational language processor 120 may formulate the hypothesis using various features and components that collectively operate to model everyday human-to-human conversations.

For example, the conversational language processor 120 may include a context tracking engine 140 that establishes meaning for a given utterance by, among other things, managing a competition among one or more context-specific domain agents 125 (e.g., redistributable, adaptable packages or modules that provide functionality for a given context, domain, system, or application). For example, the preliminary interpretations may be ranked by the Automatic Speech Recognizer 110, and the agents 125 may further analyze the preliminary interpretations to generate a weighted ranking or score, which can be used to select a "winning" one of the agents 125. The winning one of the agents 125 may then be responsible for establishing or inferring further information, updating the shared knowledge, or performing other tasks to aid in generating the intelligent hypothesis. Moreover, the context tracking engine 140 may use a context stack to track conversation topics, evaluate criteria, weigh parameters, or otherwise maintain contextual information for generating the hypothesis based on a conversational context (e.g., a context stack may be traversed in light of recent contexts, frequently used contexts, or other information included therein to determine a most likely intent of the user). By identifying a context, or correlatively, by identifying capabilities, tasks, vocabularies, or other information within the context, the context tracking engine 140 can provide highly relevant information for establishing intent, apart from meager phonetic clues.

Furthermore, the conversational language processor 120 may utilize various other forms of knowledge to inform the generation of the intelligent hypothesis. For example, various agents 125 may adaptively include domain-specific or context-specific vocabularies, concepts, available tasks, or other forms of information relevant to the respective domain or context. In addition, the various components associated with the conversational language processor 120 can invoke a voice search engine 135 (e.g., an engine that searches a network for information) to resolve information that may not be internally available (e.g., when an external knowledge source may be useful in clarifying an intent behind a particular word, command, query subject, or other aspect of an utterance).

System 100 may also enable the user and the system 100 to share assumptions and expectations relating to a given utterance, conversation, or other interaction. For example, the conversational language processor 120 may be coupled to one or more data repositories 160 that store short-term and long-term shared knowledge that inform decision making in the conversational language processor 120. The short-term shared knowledge may accumulate information during a current conversation (e.g., recognition text for previous utterances, a cross-modal user interface manipulation history, a list of previously selected tasks or invoked queries, or other information), thus dynamically establishing awareness of a cross-modal state of the voice user interface. Storage of the short-term knowledge may be modeled after human interaction, thus certain data may be expired after a psychologically appropriate amount of time (e.g., to expunge stale data), and information with long-term significance can be added to long-term shared knowledge (e.g., a new address of a long-term contact of the user). As such, the long-term shared knowledge may profile or otherwise model environmental, cognitive, historical, demographic, or other aspects of a user based on information accumulated over time (e.g., user-specific jargon, frequently requested tasks, favorite topics or concepts, etc.).

Accordingly, the conversational language processor 120 includes various features that can be used to generate intelligent hypotheses as to a user's intent in a given utterance. For example, the hypothesis may be based on information provided via the context tracking engine 140, the agents 125, the voice search engine 135, the shared knowledge, or other knowledge sources. As a result, the conversational language processor 120 may attempt to identify a conversational type or goal of the utterance (e.g., a query for retrieving a discrete piece of information, a didactic interaction for clarifying information provided by the voice user interface, or an exploratory interaction in which conversational goals may be improvised as the conversation progresses, etc.). Based on the information available and the type or goal of the conversation, the generated hypothesis can be assigned a degree of certainty, which can inform how conversational language processor 120 resolves the utterance. For example, when the degree of certainty indicates that sufficient information has been identified, the conversational language processor may invoke one or more of the agents 125, which in turn can utilize one or more applications 150 to perform a requested task (e.g., a task relating to a navigation application, an advertising application, a music application, an electronic commerce application, or other suitable applications or tasks). In another example, one or more of the agents 125 may query the data repositories 160 or the voice search engine 135 to retrieve requested information, or otherwise take action to resolve a request for information contained in the utterance.

Additionally, the conversational language processor 120 may generate cross-modal intelligent responses, which may be syntactically, grammatically, and contextually sensitive, thus providing a conversational feel to system-generated responses. When available, the intelligent response may present results of a performed task or an executed query to the user, and the response may be provided across modalities. For example, verbal and/or non-verbal outputs 180 may be used separately or in concert (e.g., by presenting information using a display device, an audible alert, a verbalized output, another output mechanism, or various combinations thereof). Further, a verbalized component of the cross-modal output 180 may be adapted to the user's manner of speaking (e.g., by varying tone, pace, timing, or other variables), thus creating verbal responses having natural variation and personality.

The intelligent responses may also be formulated to provide an output 180 that guides the user towards a subsequent response likely to be favorable for recognition. For example, when the degree of certainty reflects an ambiguous context (e.g., when the competition results in a deadlock among the agents 125), an adaptive misrecognition engine 130 may identify the utterance as ambiguous or unrecognized, and the intelligent response can be framed to disambiguate context, or request a subsequent response from the user to clarify the meaning of the utterance, for example. Further, when the conversational language processor 120 or the misrecognition engine 130 determines that a given interpretation or hypothesis was incorrect, one or more previous utterances may be reinterpreted to refine context and build more accurate short-term or long-term conversational models (e.g., an utterance of "No, I meant . . . " may indicate that a previous utterance was interpreted incorrectly, in which case various previous utterances may be reinterpreted based on a correct interpretation, thus building a more accurate conversational context). As a result, the conversational language processor 120 may recover from full or partial failure. Additional techniques for adaptively responding to misrecognition or ambiguity may be included, such as those described in U.S. patent application Ser. No. 11/200,164, entitled "System and Method of Supporting Adaptive Misrecognition in Conversational Speech," which issued as U.S. Pat. No. 7,620,549 on Nov. 17, 2009, the contents of which are hereby incorporated by reference in their entirety.

Additional information relating to the various techniques described herein, as well as other techniques that system 100 uses to provide a conversational, natural language interaction may be provided, for example, in U.S. patent application Ser. No. 11/197,504, entitled "Systems and Methods for Responding to Natural Language Speech Utterance," which issued as U.S. Pat. No. 7,640,160 on Dec. 29, 2009, U.S. patent application Ser. No. 11/212,693, entitled "Mobile Systems and Methods of Supporting Natural Language Human-Machine Machine Interactions," which issued as U.S. Pat. No. 7,949,529 on May 24, 2011, and U.S. patent application Ser. No. 11/580,926, entitled "System and Method for a Cooperative Conversational Voice User Interface," which issued as U.S. Pat. No. 8,073,681 on Dec. 6, 2011, the contents of which are hereby incorporated by reference in their entirety.

As such, system 100 may provide an environment where conversational, natural language interactions can occur between a user and the system 100. Further, as will be described in greater below, system 100 can be implemented to provide the conversational, natural language interactions, for example, as a voice user interface to one or more electronic devices or applications, including a navigation device. As will also be apparent from the further descriptions provided herein, the system 100 has capabilities for cross-device and cross-modal awareness, such that system 100 provides an environment in which the user can engage in a cooperative, natural language dialogue to request voice services relating to many different devices or applications.

Figure 2:
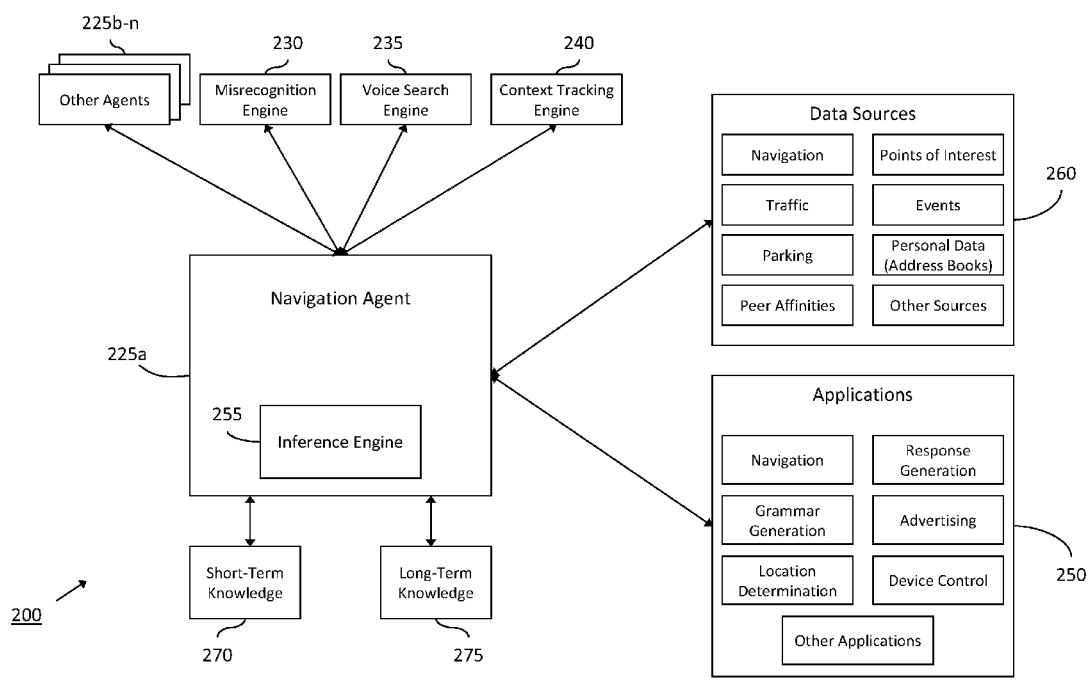
FIG. 2 illustrates a block diagram of exemplary agent-based architecture for providing a navigation device with a conversational, natural language voice user interface according to various aspects of the invention.

According to various aspects of the invention, FIG. 2 illustrates a block diagram of exemplary agent-based architecture 200, which can provide a conversational, natural language voice user interface to a navigation device. The architecture 200 may include a plurality of agents 225*a-n*, which include specialized software, data, content, or other information that provide functionality, behavior, services, data, and other information in a plurality of respective contextual domains. The architecture 200 may be an integrated and dynamically adaptable environment, in which the agents 225 autonomously react, adapt, and reconfigure to provide optimal service in the environment. For example, by building context over time (e.g., by generating short and long-term profiles of a user, conversations with the user, frequent topics or preferences, etc.), the navigation agent 225*a* may automatically combine knowledge, adapt preferences, remove conflicts, or perform other adaptations to refine or otherwise optimize an operational framework thereof.

For example, the agents 225, which include at least a navigation agent 225*a*, may adapt through ongoing use of short-term shared knowledge 270 and long-term shared knowledge 275 about a user's behavior, preferences, or other characteristics. Further, agent adaptation may occur across the plurality of agents 225, for example, in response to various ones of the agents 225 resolving voice-based requests (e.g., by invoking one or more applications 250, querying one or more data sources 260, cooperating with one or more other agents 225, or learning through a misrecognition engine 230, a voice search engine 235, a context tracking engine 24, etc.). In various implementations, adaptation may occur autonomously as a by-product of the agents 225 providing voice services, generating inferences, identifying affinities (e.g., among users, peers, communities, etc.), receiving updates from external sources (e.g., an update manager can update content, behavior, data, commands, domain knowledge, keywords, concepts, dictionaries, or other information for one or more of the agents 225), or in other ways, as will be apparent.

As illustrated in FIG. 2, the architecture 200 provides the conversational, natural language voice user interface to the navigation device by way of at least a navigation agent 225*a*. The navigation agent 225*a* can include, among other things, various navigation-specific content packages (e.g., dictionaries, available queries, tasks, commands, dynamic grammars, etc.), response lists (e.g., appropriate responses to commands, queries, or other requests), personality profiles (e.g., for creating a natural feel to system-generated speech), substitution lists (e.g., for substituting or transforming data into a structured form that can be understood by a target information source), or various other forms of navigation-specific information. Further, the navigation agent 225*a* may be associated with parameters and operating data provided by other services in the architecture 200 (e.g., available devices, applications 250, agents 225, etc.), pointers to local or remote data sources (e.g., short-term shared knowledge 270, long-term shared knowledge 275, data sources 260, voice search engine 235, etc.), among various other forms of information.

The data sources 260 used by the navigation agent 225*a* may include, among other things, data relating to navigation (e.g., maps, addresses, street names, directories, alternate routes, etc.), points-of-interest (e.g., restaurants, hotels, museums, tourist attractions, gas stations, etc.), traffic (e.g., dynamic road conditions, traffic, detours, or other traffic-related information), events (e.g., sporting events, concerts, protests, etc.), parking (e.g., parking garages, restricted areas or times, street lots, street parking, etc.), personal data (e.g., telephone numbers and addresses associated with a user's contact lists), peer affinities (e.g., recommendations based on similarities among users having similar preferences, demographic profiles, or other characteristics). The data sources 260 may be populated in various ways, such as being based on one or models, received via a data service, extended or refined through adaptation, or in other ways, as will be apparent.

Further, contextual information relating to a navigation domain may be maintained via the context tracking engine 240, short-term shared knowledge 270, and long-term shared knowledge 275, among other things. For example, the contextual information may relate to tracked topics, user location, routes traveled, previous requests, user interface state, user behavior, preferences, demographics, or other characteristics, among other types of contextual information. For example, context may be built and utilized using techniques described in greater detail above with reference to FIG. 1, or in the above-referenced U.S. Patent Applications and issued U.S. Patents, or various combinations thereof. Moreover, when navigation agent 225a cannot find information locally within architecture 200, and the information cannot be inferred, the information may be requested from one or more other agents 225b-n (e.g., to request domain-specific information), other devices, the voice search engine 235 (e.g., to search a network), external sources (e.g., the update manager may be invoked to download available updates, which may have the information), or other sources, as will be apparent. If the information can be located through one or more of the other sources, the navigation agent 225a may be adapted, extended, or otherwise updated to make the information available subsequently.

Accordingly, the navigation agent 225a may be coupled with various sources of information, and may make use of context, while communicating with various other adaptable agents 225b-n and other system components to provide voice navigation services. Thus, context, shared knowledge, maps, points of interest, contact lists, user or peer affinities, dynamic grammars, available applications, or various other aspects of the navigation architecture 200 can be shared or otherwise made available to various components, devices, or aspects of the architecture 200. As a result, an inference engine 255 included with the navigation agent 225a may various knowledge sources and other resources available to provide an integrated voice navigation services environment. For example, the inference engine 255 may generate inferences from the available knowledge and resources by applying one or more rules, policies, or other inferencing mechanisms to generate probable interpretations of utterances in the environment (e.g., phonetic fuzzy matching, inductive logic, Bayesian probability analysis, monotonic or non-monotonic reasoning, etc.).

For instance, as described in greater detail above, the navigation agent 225a and one or more other agents 225b-n may compete in analyzing one or more preliminary interpretations of an utterance to generate one or more respective probable interpretations of the utterance. The navigation agent 225a may then be invoked to process the probable interpretation (e.g., by resolving information contained in the utterance) upon being identified as a "winning" one of the competing agents. For example, which of the competing agents wins may depend on context or other information contained in the utterance, whereby the navigation agent 225a may win and recalculate a route in response to an utterance of "This traffic is terrible, maybe back roads," while a music agent may win and change a radio channel in response to an utterance of "Traffic is terrible, maybe some Oldies," while a movie agent may win and search for movie show times in response to an utterance of "Traffic was terrible, maybe a comedy." Thus, when the navigation agent 225a generates a probable interpretation that results in being a winning one of the agents 225, the navigation agent 225a may manage processed for searching, inferring, or otherwise identifying information in light of context to provide voice navigation services using one or more applications 250 (e.g., navigation, grammar generation, location determination, response generation, advertising, device control, or other applications available within architecture 200).

For example, the navigation agent 225a may utilize the inference engine 255 to infer keywords or criteria not explicitly provided in the utterance, determine suitable responses to subjective or indeterminate utterances (e.g., selecting a most likely answer to a query, asking a user for more information, etc.), generate events, identify peer affinities, or otherwise generate inferences for resolving navigation-related requests. The inference engine 255 may generate such inferences through awareness of previous context (e.g., through information provided by the context tracking engine 240), short-term or long-term shared knowledge 270, command histories, states of vehicular systems, user interfaces, or other devices, data sources 260, or other available information. For example, in an exemplary illustration, previous context, shared knowledge, and other information sources may be utilized in conjunction with the inference engine 255 and/or various other components of architecture 200 to enable a human to machine interaction that may occur as follows:

| | |
|---|---|
| User: | "Show me restaurants around here." |
| Voice User Interface: | "All I can find is fast food, which you don't like." |
| User: | "Okay, how about closer to the hotel?" |
| Voice User Interface: | "Found an Indian restaurant with good reviews. Want me to call them?" |
| User: | "Yeah go ahead, that sounds good." |

In the above illustrated example, the first utterance establishes a context of "restaurants," and the voice user interface responds to the utterance in light of a shared knowledge inference indicating that the user does not like fast food. Furthermore, while the second utterance does not explicitly reference a restaurant, the context established in the first utterance can be used to infer the unreferenced information, forming an unambiguous request out of what would otherwise be ambiguous. Further still, long-term shared knowledge 275 about the user (e.g., the user may frequently go to Indian restaurants) and short-term knowledge 270 about the user (e.g., a hotel associated with a current route) can narrow a search space for resolving the second utterance. Moreover, the voice user interface may invoke the response generation application to advance the conversation towards a resolution (e.g., by prompting the user to call the restaurant). Because the integrated environment has cross-device awareness, the user's subsequent response can result in the device control application formulating an appropriate command structure to dial the user's mobile phone, which may or may not be distinct from the navigation device. Accordingly, as illustrated in this example, robust awareness of context, shared knowledge, available applications, and available systems or devices, among other things, has enabled the user to use natural language to locate a restaurant along a current route matching the user's preferences, while also enabling the user to dial a phone to call the restaurant, without the user having to manually interact with devices or otherwise interact with cumbersome human to machine interfaces.

It will be understood, however, that the above illustrated dialogue provides but one example of a cooperative conversation that can occur between a user and a system that includes the above-described architecture 200. Because the architecture 200 supports free form interactions, and can tolerate serendipitous variations in human speech, vocabulary usage, or other factors, it will be understood that no two conversational interactions between the user and the system will necessarily be alike. As such, the user can seamlessly switch among contexts, allowing subsequent utterances to occur in various available domains (e.g., a navigation-related utterance of "Take me to the Seahawks game" may be followed up with subsequent cross-domain utterances, such as "Are there tickets left?" or "When does it start?"). Thus, although various descriptions illustrate exemplary ways in which the agent-based architecture 200 can be used for voice navigation services, it will be apparent that, in a given utterance, the user can provide natural language voice-based requests relating to various available contexts, domains, applications, devices, information sources, or various combinations thereof.

The navigation application available within architecture 200 may resolve natural language, voice-based requests relating to navigation (e.g., calculating routes, identifying locations, displaying maps, etc.). The navigation application can provide a user with interactive, data-driven directions to a destination or waypoint, wherein the user can specify the destination or waypoint using free-form natural language (e.g., the user can identify full or partial destinations, including a specific address, a general vicinity, a city, a name or type of a place, a name or type of a business, a name of a person, etc.). As a result, in various implementations, the navigation application may perform post-processing on the full or partial destinations to identify a suitable address for calculating a route (e.g., a closest address that makes "sense"). For example, an utterance containing a full or partial destination may be analyzed to identify one or more probable destinations (e.g., an N-best list of destinations), which may be subject to post-processing that weighs the identified probable destinations based on various factors. Thus, the probable destination most likely to provide a suitable (preliminary or complete) route may be identified from the N-best list.

For example, in an illustrative conversation between a user and the voice user interface, the user may utter a voice-based input of "Take me to Seattle." Based on a current location of the user (e.g., as determined using one or more navigation sensors, radio frequency identifiers, local or remote map databases, etc.), the navigation application may select an address in Seattle that provides a route from the current location to Seattle (e.g., a central point in Seattle may be selected for long distance travel, whereas an address in northern Seattle may be selected for a current location being close to north Seattle). Further, when the requested destination does not specify a final destination (e.g., as in the above example), the user may successively refine the final destination in subsequent requests, and the post-processing may continue to select additional addresses based on the current location, a current route, or other factors. For instance, continuing the above-provided example, a subsequent input of "Take me to Pike Street" may result in the post-processing analyzing the current route to determine an appropriate address on Pike Street, and possibly recalculating the route, as necessary. Thus, the current route may have the user driving north-bound on Interstate-5, such that an address may be selected on Pike Street on a same side as north-bound lanes of Interstate-5 (e.g., preserving current routing information). The final destination may continue to be successively refined, in combination with the post-processing. As a result, a user knowing only that a destination falls along a 500-block of Pike Street can specify, "501 Pike Street," and even if such an address does not exist, the post-processing may find a closest address that makes sense, thus routing the user to the 500-block of Pike Street.

In addition, the navigation application may provide dynamic, data-driven directions to the destination or dynamically provide routing information, among other things. Furthermore, the response generation application may work together with the navigation application and/or one or more other applications to generate system responses personalized for the user. For instance, the navigation application may access data associated with various user-specific and environmental data sources to provide personalized data-driven directions along a route, which can be recalculated or modified based on information taken from the data sources. Thus, in one example, the response generation application may generate personalized data-driven directions as follows:

| Voice User Interface: | "Go to Bob's House." |
| Voice User Interface: | "Take a left on 14th Street." |
| Voice User Interface: | "Make a right here to get on the highway, and prepare for heavy traffic." |

In the above-illustrated example, the response has been personalized by framing directions in terms of one of the user's contacts (i.e., Bob), while an available source of traffic data has been used to provide data-driven directions. In another example, data that may affect routing can be identified and used to recalculate a route or identify alternate routes (e.g., weather data may be used to avoid snowy roads, or event data may be used to avoid a route along which a protest may be occurring). As such, data may be obtained dynamically to identify alternate routes, recalculate routes, or otherwise provide optimal routing service. In various implementations, the source of data may be based on persistent models, dynamically received data (e.g., a given highway may regularly have high volume during rush hour or sporting events), or other information. Routes may be recalculated automatically (e.g., user preferences may dictate that heavy traffic be avoided, or sporting event traffic may not be avoided when the user has tickets to the event), or the user can request recalculation through additional utterances (e.g., "I don't want to sit in traffic, can we go a different way?"). Further, possible answers or responses to a given utterance may be filtered according to a current route (e.g., possible results provided for an utterance of "Find me a gas station" may be filtered according to those gas stations within a given proximity of the route). Moreover, continuing the above-provided example, the user may later return to a point of origin, and personalized responses may include return directions, such as "Go back the way you came on 14th Street." Thus, the personalized responses may also create a natural feel to the directions, and may be based on context that builds over time.

The navigation architecture 200 may be used in conjunction with an electronic device capable of accepting voice-based inputs and providing navigation-related information. For example, architecture 200 may be implemented within a handheld device (e.g., personal navigation device, mobile phone, etc.), a telematics devices (e.g., a vehicular navigation system), or various other suitable devices. Furthermore, various functional aspects of the architecture 200 may reside at a client device, at a server, or various combinations thereof. For example, a voice-based input may be received by the client device (e.g., a personal navigation device), which may communicate with the server to retrieve information, perform a task, process the input, or for other reasons. The server may subsequently return information to the client device in response to the request. In various implementations, however, the voice-based input may be processed within the system (e.g., processing delays may be reduced by minimizing communication with the server). Other suitable arrangements may be used, as will be apparent, and specific arrangements as to how information can be processed, retrieved, or returned to the user, among other things, may be highly dependent on context or specific implementations (e.g., what information can be obtained locally, remotely, or otherwise, what services a user subscribes to, etc.).

Figure 3:
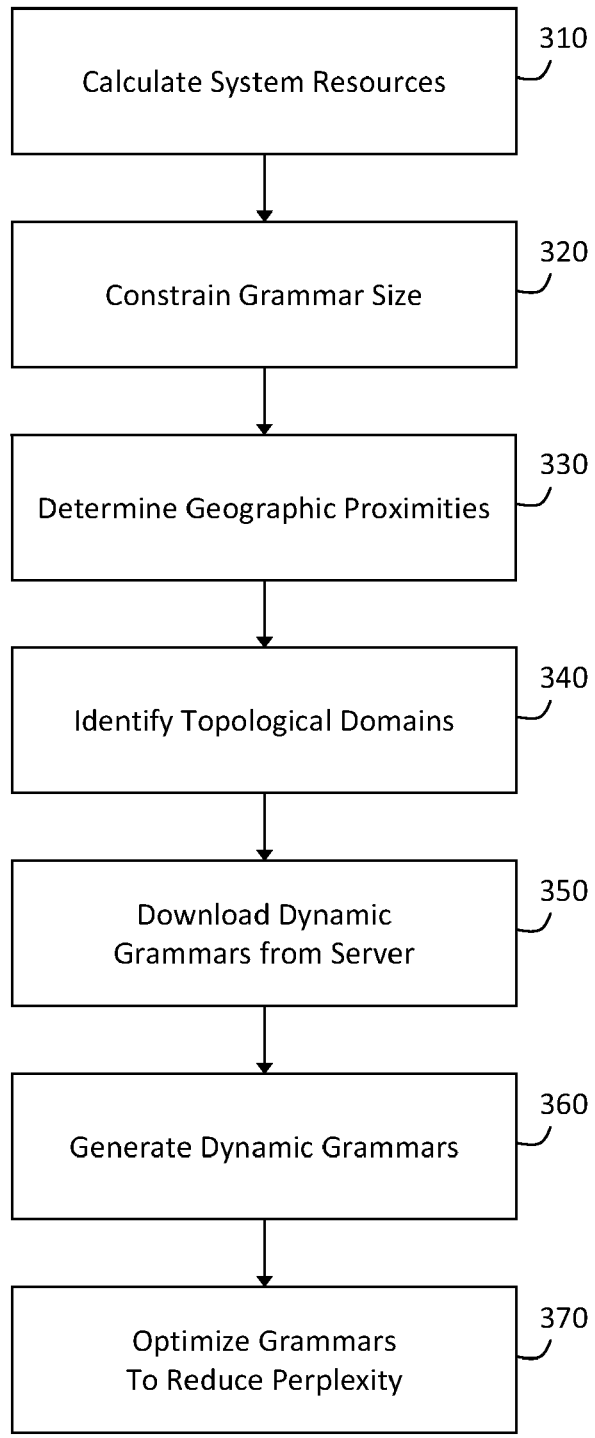
FIG. 3 illustrates a flow diagram of an exemplary method for dynamically generating recognition grammars for a navigation device having a conversational, natural language voice user interface according to various aspects of the invention.

According to various aspects of the invention, FIG. 3 illustrates a flow diagram of an exemplary method 300 for dynamically generating and/or loading recognition grammars in a conversational, natural language voice user interface. For example, a grammar generator application (e.g., as illustrated in FIG. 2) may dynamically generate and/or load recognition grammars for use by a navigation agent, an Automatic Speech Recognizer, a context stack, or other components in the voice user interface that incorporate a recognition grammar. While grammar generating method 300 may be used by various components of the natural language voice user interface, the method 300 may be particularly useful in reducing processing overhead and reducing perplexity or confusion. For example, by efficiently generating, updating, loading, extending, or otherwise building dynamic grammars based on various factors, as will described in greater detail herein, bottlenecks can be avoided, conflicts can be reduced, or other aspects of interpreting utterances using a grammar can be optimized.

For example, in various implementations, grammar generation may be keyed to an amount of available resources in a system that includes the voice user interface. Thus, at an operation 310, the amount of system available resources may be calculated, and a subsequent operation 320 may constrain a size of the dynamic grammar based on the calculated resources. For instance, in embedded devices or other devices having low amounts of dynamic memory, the constrained grammar size may ensure that only as many resources as necessary will be occupied. Thus, throughput in the low-memory device will not be degraded by a large-list grammar over-occupying processing capacity. In another example, the size of the dynamic grammar can be reduced by eliminating redundant keywords, criteria, or other information available in the context stack, the shared knowledge, or other local sources. However, it will be apparent that various other techniques may be used to constrain grammar size, and that effectively considering available system resources can provide processing improvements in various environments.

In a navigational context, in which a user's location can change from one moment to another, grammar generation may be further optimized using techniques of geographical chunking. For instance, a user's location can be determined at a given moment (e.g., via navigation sensors, global positioning systems, etc.), and an operation 330 can use the determined location to determine one or more geographic proximities associated with the location. Subsequently, at an operation 340, the determined proximities may be used to identify one or more topological domains appropriate for the determined proximities.

As such, the proximities determined in operation 330 may be weighed or analyzed in various ways to determine how to utilize the topological domains identified in operation 340 in generating the dynamic grammar. For example, the topological domains may reflect physical proximities (e.g., distances from a current location, such as everything within a five-mile radius), civil organization proximities (e.g., regions, states, cities, neighborhoods, subdivisions, localities, etc.), temporal proximities (e.g., amounts of travel time from the current location, where road classes or other information may be used to estimate fastest/safest routes, such as highways and interstates being faster than city or surface roads), directional proximities (e.g., based on directional travel vectors, where a point ten miles ahead may be considered "closer" than a point one mile behind based on a direction of travel, an amount of time to turn around, etc.), or various combinations thereof. As a result, by mapping the user's geographic proximities to one or more topological domains, dynamic grammars may be pruned, extended, swapped in or out of memory, or otherwise generated and/or loaded to provide optimal recognition based on location, time, travel, or other factors (e.g., information may be swapped in and out of a grammar as a user drives from one area to another, optimizing the information along the drive to ensure that the system resources utilize information presently relevant for a given location).

Furthermore, the topological domains may be subdivided into a plurality of tiles, which may in turn be subdivided into a plurality of subtiles. For example, a civil organization topological domain may include a tile representing grammar information for a state, and the tile may include one or more subtiles for counties within the state. Further, the county subtiles may include subtiles for various cities, neighborhoods, or other organizational boundaries within respective counties. Thus, the geographic proximities and topological domains used to build the dynamic grammar may be based on a variety of factors, and can be subdivided or weighed in various ways to determine what information to include in the grammar. Moreover, geographic& chunks based on physical, civil organization, temporal, directional, or other proximities may be extended into various other domains in which a topological taxonomy can be placed. As a result, the geographical chunking techniques may have particular relevance in navigation or other location-dependent voice recognition systems, yet the techniques can be suitably applied in various contexts or domains in which geography or location may have relevance.

As various implementations generate the recognition grammars dynamically, for example, to preserve system resources, information available to extend, update, or otherwise update the grammar may be stored remotely (e.g., on a server). Thus, various implementations may include a system having a network connection, a data service, or another communication mechanism for establishing a link to the remote source. Based on the proximities and/or the topological domains identified for a given location, context, utterance, or otherwise, one or more grammar tiles and/or subtiles may be downloaded from the remote source at an operation 350. Further, the remote source may be adapted to store, analyze, or otherwise process certain information to refine the grammar information stored therein. For example, when a given device communicates with the remote source at operation 350, the remote source may receive identifying information relating to a user of the device (e.g., user preferences, user characteristics, request characteristics, etc.), requested information, or other information. Based on the received information, the remote source may dynamically update various tiles and/or subtiles, build affinities (e.g., among users, peers, communities, etc.), or perform other actions to refine a process by which relevant information can be identified (e.g., the remote source may determine that various different users, who share certain common demographics, may be interested in particular events, locations, etc.).

Thus, the grammar information downloaded at operation 350 may be based on a variety of factors, including information in a current voice-based input, current geographical proximities of the user, topological domains or geographical chunks related to the current geographical proximities, or various kinds of affinities, among other things. Based on these and other factors, appropriate information may be retrieved from various local or remote data sources (e.g., a local repository may contain a great deal of grammar information, a portion of which may be used by the dynamic grammar to interpret an utterance). The retrieved information may then be used to generate the dynamic grammars at an operation 360. As a result, the dynamic grammars may be adapted to include information favorable for correctly interpreting a given utterance. Furthermore, at an operation 370, the favorability of correct interpretations may further be improved by post-processing the generated grammars using one or more optimization techniques, such as reducing perplexity in the grammar. For example, when the grammar generated at operation 360 includes two or more elements likely to be confused (e.g., two or more streets having a same name), the optimization operation 370 may eliminate one or more of the elements to reduce confusion (e.g., selecting the element closest to a user's current location, or other criteria). In another example, when an interpretation turns out to be incorrect (e.g., a subsequent utterance may be "No, 14th Street Northwest, not Northeast"), the dynamic grammar may be pruned to eliminate information associated with the incorrect interpretation (e.g., information associated with Northeast may be removed). As a result, the optimization operation 370 can reduce overhead, assure that mistakes will not be repeated, and/or improve accuracy of interpretations, among other things.

Although various exemplary operations have been described for dynamically extending, pruning, loading, or otherwise generating recognition grammars, it will be apparent that in operation, the natural language voice user interface may use various forms of information or techniques to determine an optimal grammar. For instance, in addition to being based on available system resources, likelihood of perplexity, geographical proximities, or user affinities, the grammar may be generated in response to conversational contexts, shared knowledge about a user, and/or adaptable agent behavior, among other factors. Accordingly, the dynamic grammar can be structured to recognize queries, commands, or other information in an utterance based on information most likely to be relevant for the utterance, with minimal ambiguity. Further, when the utterance cannot be resolved using the information currently in the grammar, various information sources or techniques may be available to update the grammar in a way that will be favorable for recognition. Thus, the above-described aspects and features of the grammar generation method 300 should be regarded as exemplary only, as many variations will be possible without departing from the inventive concepts described.

Figure 4:
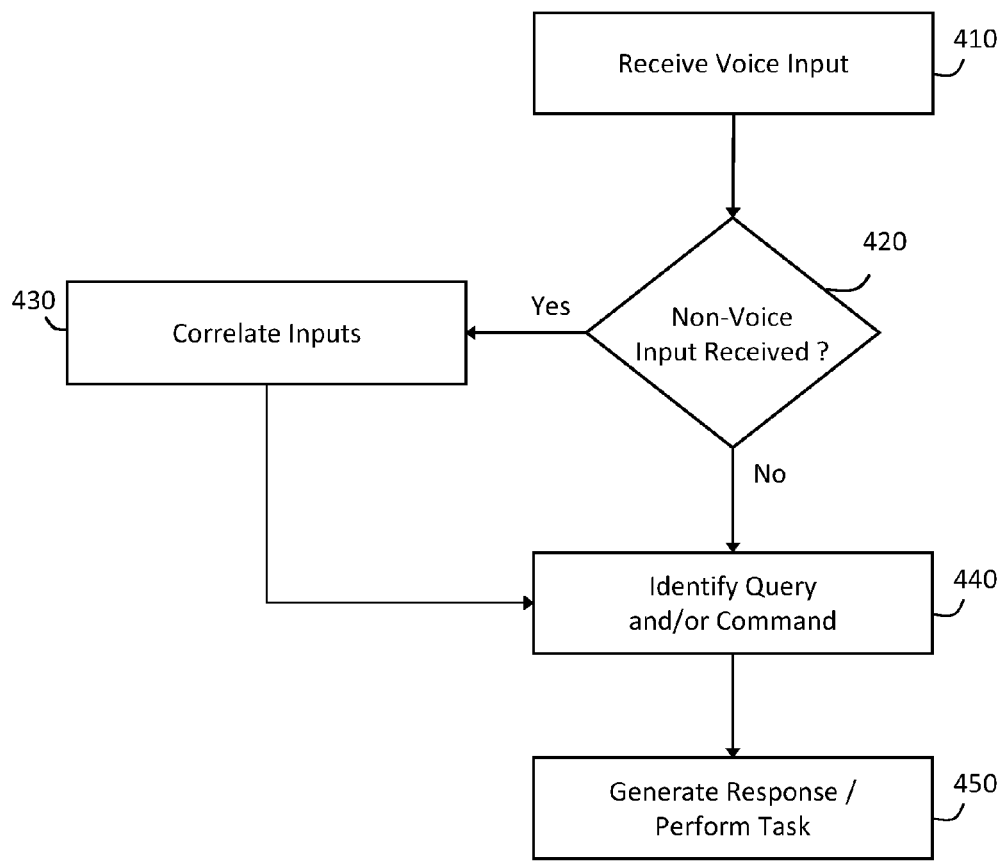
FIG. 4 illustrates a flow diagram of an exemplary method for processing multi-modal voice-based inputs provided to a navigation device having a conversational, natural language voice user interface according to various aspects of the invention.

According to various aspects of the invention, FIG. 4 illustrates a flow diagram of an exemplary method 400 for processing multi-modal voice inputs using a conversational, natural language voice user interface. As described in connection with FIG. 1 above, method 400 may be performed in a voice user interface having a mechanism for receiving voice inputs (e.g., a directional microphone, an array of microphones, or other devices that encode speech), wherein the voice inputs include at least a voice component (e.g., an utterance). The utterance, which may be received in an operation 410, may be provided using natural language or other free form manner of expression.

Furthermore, to enable processing of multi-modal voice inputs, the voice user interface may have one or more input mechanisms for receiving non-voice input components (e.g., inputs provided via a keypad, a touch-screen, a stylus/tablet combination, a mouse, a keyboard, or other input modalities). As such, in operation 410, the received voice input may include a non-voice input component in addition to the utterance, such that an amount of input information may be maximized through usage of multi-modal inputs. For example, the user can use other input modalities to clarify a meaning of the utterance, provide additional information about the utterance, reduce a number of device interactions needed to make a given request, or otherwise maximize an amount of information provided in connection with a given utterance. For example, a multi-modal voice input may be used to efficiently interact with a map displayed on a navigation device (e.g., an utterance of "I only need to see this area" may be coupled with a stylus input that circles a given portion of a map, and the combination of inputs may result in a display of the circled portion of the map).

Thus, for a given voice input, a decisional operation 420 may determine whether a non-voice component accompanies an utterance in the voice input. For example, in various implementations, the various input mechanisms associated with the voice user interface may be coupled to an Alternating Voice and Data (AVD) system. As a result, input data may alternate between voice and data, or the input data may be multiplexed together in a single stream, for example, to allocate processing resources where needed at a given moment.

When decisional operation 420 determines that a non-voice input component has been received, the voice and non-voice components may be correlated in an operation 430. For example, the voice component may be processed using accurate speech recognition techniques, and the voice component may further be parsed and interpreted in light of context, shared knowledge, and available data sources, among other things, as described in greater detail above. As such, correlation operation 430 may generate additional information that can inform context, shared knowledge, or other information for processing the voice input. For instance, as discussed above, short-term shared knowledge may include awareness of various user interface states, which may be affected by non-voice components. Thus, correlation operation 430 may assist the voice user interface in developing one or more preliminary interpretations of the utterance, for example, by relating information in the utterance to information in the non-voice inputs, or vice versa. For example, a multi-modal input could include a user touching a stylus to one of a number of restaurant listings displayed on a touch-screen interface, while also providing an utterance relating to the touched listing (e.g., "Call this one."). In this example, correlation operation 430 can interpret "this one" to refer to the touched telephone listing, providing additional information for processing the voice input.

However, it will be apparent that voice inputs need not necessarily include non-voice components. As such, when the voice input includes only utterances, verbalizations, or other spoken components, decisional operation 420 may advance method 400 directly to an operation 440. For instance, as will be apparent from the further descriptions provided elsewhere in this specification, the natural language voice user interface may efficiently resolve many requests that include only voice. As such, a received voice input can include stand-alone utterances, such that a navigation device, vehicular system, mobile phone, or other device can be controlled in one step using voice. For example, using existing navigation systems or other navigation interfaces, a user must often take multiple steps to configure a displayed map, even for relatively simple tasks (e.g., multiple button and/or stylus inputs may be required to display a desired portion of a map). By contrast, using the natural language voice user interface, the user can simplify controlling a device using one-step voice control (e.g., a map may be controlled using utterances of "Move the map up," "Move the map Northeast," "Show me downtown Seattle," or other utterances that provide all information necessary to control a device in one-step), which may substantially reduce a number of device interactions needed to control the device.

In various instances, (e.g., whether the input received in operation 410 includes an utterance, a non-voice component, or various combinations thereof), one or more queries and/or commands contained in the voice input may be identified in operation 440. Once the one or more preliminary interpretations of the multi-modal input have been generated, appropriate contextual information, shared knowledge, external knowledge sources, or other information may be used to identify the queries and/or the commands contained in the utterance. The information sources relied upon may be associated with various devices, systems, or other components of the integrated voice user interface environment. Thus, information associated with a navigation device (e.g., maps, points-of-interest, etc.) may be distributed for sharing with other devices in the environment (e.g., a personal digital assistant capable of rendering maps may display a map associated with a navigation device, or a mobile phone may dial a telephone number of a point-of-interest associated with the navigation device, etc.). Moreover, the information may be shared in a bi-directional manner, such that information sources associated various devices can be shared with other devices in the integrated environment.

Information may be associated persistently (e.g., by storing all information on a server, an online data backup system, or other data repositories), or may be built dynamically as a function of processing multi-modal voice inputs. For example, a user may maintain an address book of contacts, e-mail addresses, street addresses, telephone numbers, or other information using a commercial service provider (e.g., GMail, Yahoo Mail, or another service provider capable of storing address books). When a user makes a request (e.g., via voice input, non-voice input, or multi-modal input) in which the service provider manages information needed to resolve the request, the information may be pulled and shared with a device that will be used to resolve the request. For example, a mobile phone may be integrated with the navigation voice user interface (e.g., a mobile phone having a GPS receiver), and the mobile phone may initially (e.g., at a first-time use) have no local contacts, addresses, telephone numbers, or other information. Thus, a user utterance of "I'm running late for dinner at Jane's house, call her to let her know I'm on the way" may result in a query being formulated to the service provider in order to retrieve an address and telephone number associated with Jane's house for the mobile phone to process accordingly. Moreover, information relating to being "late" may be processed to generate a route that avoids traffic, uses highways, or otherwise reduces an amount of travel time.

A variety of cognitive models, contextual models, user-specific models, or other models may be used to identify the query and/or command in operation 440. For example, a given input may include information relating to one or more contextual domains, one or more of which may be invoked to interpret and/or infer certain keywords, concepts, or other information contained in the input. Moreover, short-term and long-term shared knowledge about a user's behavior and preferences may be used in a hybrid recognition model, for example, relating to navigation queries and/or commands. The hybrid recognition model may be used to generate probable or likely interpretations of an utterance using a combination of semantic analysis and contextual inferences. For example, certain syllables, words, phrases, requests, queries, commands, or other identifiable aspects of an utterance may be identified as being more likely to occur based on a given contextual history. The contextual history can be based on the short-term or the long-term shared knowledge about the user, previous utterances in a current conversation, common requests in a given environment (e.g., a navigation device may be used most often for displaying maps, calculating routes, and identifying locations), or other information. Thus, the hybrid recognition model for operation 440 may include various processes for analyzing semantic patterns to resolve what was said by an utterance, in addition to various processes for relying on contextual history to resolve what was meant by the utterance.

In addition, the hybrid recognition model may be used in conjunction with, or independently of, a peer to peer recognition model. For example, contextual histories may include various preferences or user characteristics, in addition to providing a basis for inferring information about a user based on patterns of usage or behavior, among others. As a result, the recognition models may include additional awareness relating to global usage patterns, preferences, or other characteristics of peer users on a global basis. For example, certain keywords, concepts, queries, commands, or other aspects of a contextual framework may be commonly employed by all users within a context. In another example, users of certain demographics may share common jargon, slang, or other semantic speech patterns. As a result, operation 440 may utilize various recognition models, which consider context and semantics in various dimensions, to identify queries or command. For example, in addition to information generally available within a given environment or context, a voice input may be recognized using context and semantics based on short-term or long-term behavior or preferences for a specific user, global users, peer users, or other meaningful user abstractions.

Accordingly, upon identifying a suitable query and/or command contained in the utterance, a suitable response may be generated, or a task may be performed in an operation 450. As will be apparent from the descriptions already provided, the generated response and/or the performed task may be highly dependent on context and information contained in a given voice input. As a result, when certain voice inputs may be unclear, ambiguous, or otherwise unclear, the generated response may prompt a user for an additional input, and the response may be framed in a way favorable for recognition (e.g., an utterance of "Where is Joe's Pizza" provided while a user is in New York City may return too many results to be meaningful, such that results may be weighed and displayed for a user to select a correct one of the results).

Furthermore, voice inputs may be used to perform compound requests, which could otherwise be impossible to perform using a single manual input. For example, a single voice-based input may include a compound map control request, such as "Show me downtown Seattle." As such, operation 450 may perform tasks of retrieving a map of Seattle and automatically zooming in on a downtown area of the Seattle map. Further, one or more responses or other outputs may be generated, such as suggesting a route to a frequent destination, identifying possible points-of-interest to the user, or searching for traffic or event notifications, among other things. Many other variations will be apparent, including characteristics of the received inputs (e.g., utterances, non-voice inputs, etc.), the requested queries or commands, the generated responses, and the performed tasks, among other things. As such, it will be apparent that the method 400 illustrated herein may enable users to request many different navigation related tasks verbally, non-verbally, or various combinations thereof, such that the users can request various kinds of information or tasks available in the environment (e.g., relating to various devices, information sources, etc.). Thus, method 400 may operate in an environment in which the natural language voice user interface has been associated with one or more devices that provide navigation services.

Figure 5:
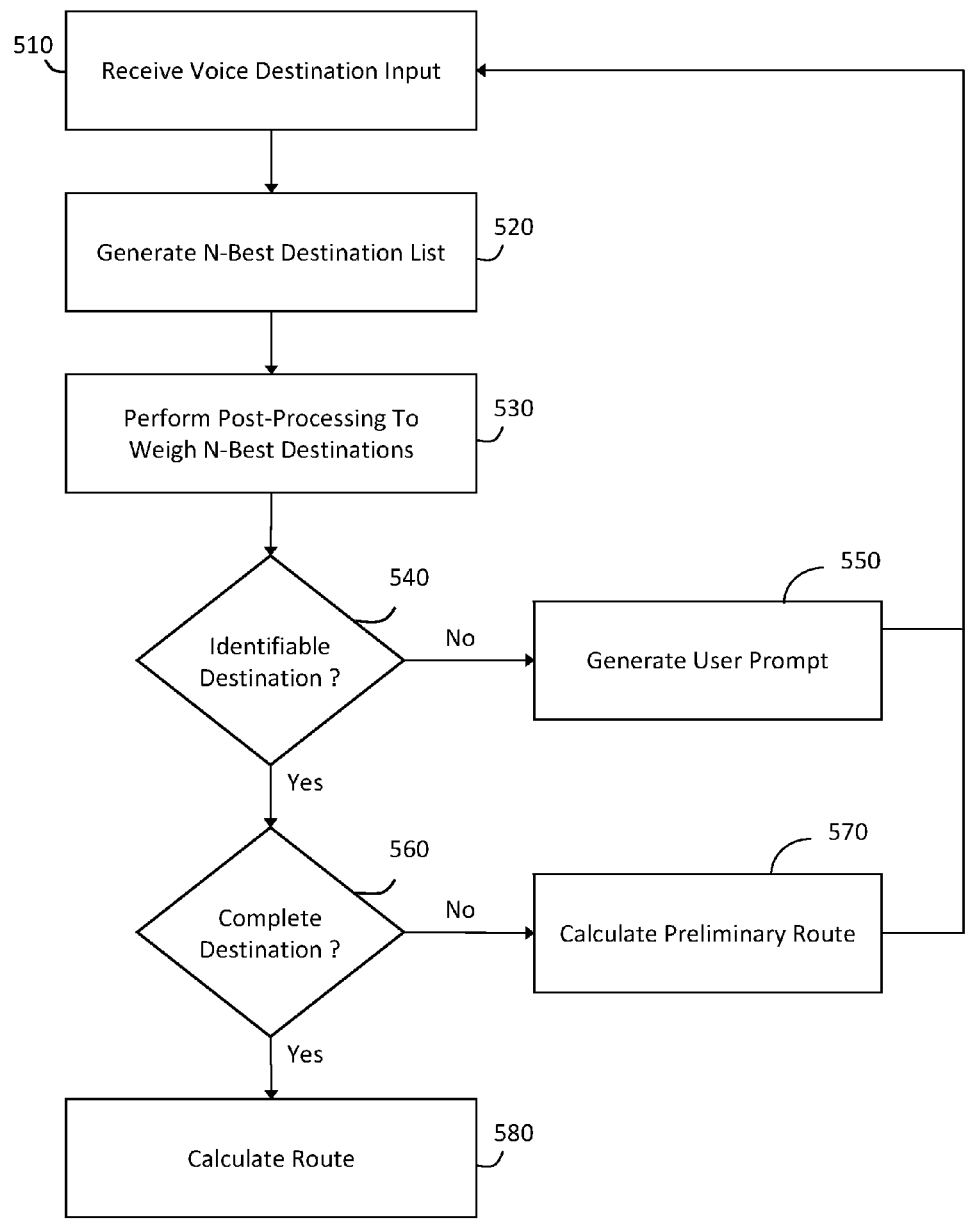
FIG. 5 illustrates a flow diagram of an exemplary method for calculating routes based on voice-based inputs provided to a navigation device having a conversational, natural language voice user interface according to various aspects of the invention.

According to various aspects of the invention, FIG. 5 illustrates a flow diagram of an exemplary method for calculating navigation routes from voice destination entries provided to a navigation device having a conversational, natural language voice user interface. As previously described, the voice user interface may calculate routes, provide dynamic data-driven directions to a destination, provide dynamic routing to a destination, perform post-processing of full or partial destination entries, or otherwise provide various voice navigation services. Thus, as illustrated in FIG. 5, the method for calculating routes may support successive refinement of a voice destination entry, wherein context, agent adaptation, and shared knowledge, among other things, can help a user to narrow down a final destination using voice commands, multi-modal commands, or various combinations thereof. However, though FIG. 5 specifically illustrates an exemplary implementation of successive refinement for voice destination entry, it will be apparent that the techniques described herein can be applied in performing various tasks in which generalized approximations can suitably be refined through successive voice or multi-modal commands to narrow down information sought by a user in various domains, contexts, applications, devices, or other components that employ the techniques described herein. As a result, successive refinement can be implemented in various domains that enable a user to "drill down" to a specific piece of information or data through specifying more and more specific criteria about the information sought.

As illustrated in FIG. 5, for example, successive refinement of a final destination may includes instances in which a user specifies the destination in a single utterance, over a plurality of utterances (e.g., which sequentially narrow down approximations of the destination), as well as instances in which a system identifies the destination (e.g., through generating inferences, using context or shared knowledge, etc.). For example, a given approximation of a final destination may be associated with a finite number of possible destinations, and the system may be able to unambiguously identify the final destination from among the finite possible destinations by generating inferences, by relying on context, shared knowledge, and other information, or by other ways, as will be apparent. Moreover, in another example, successively refining the destination may be modeled after patterns of human interaction between passengers in a taxicab, or other similar situations in which a route or a destination may be narrowed down or otherwise refined over a course of interaction. For example, passengers in taxicabs sometimes specify a general approximation of a destination (e.g., a passenger picked up in Arlington, Va. may state, "I'm going to the Foggy Bottom area of D.C."), which may result in a cab driver beginning to drive along a preferred route to the approximated destination (e.g., the driver may know to head towards Rock Creek Parkway when driving from Arlington to Foggy Bottom). While en route to the approximated destination, the passenger and/or the driver may cooperate to refine the final destination through one or more subsequent interactions (e.g., the cab driver may ask, "Where in Foggy Bottom are you headed?", and the passenger may specify "McFadden's," which may provide sufficient information for the driver to determine a route to the destination).

However, it will be apparent that no two sequences of interactions will necessarily be alike. For example, the passenger may provide additional information relating to the final destination without being prompted by the driver, or the driver may not begin driving until the final destination has been identified (e.g., when several routes may be available, and the final destination has an impact on which route will be selected). As such, cooperative, conversational interactions may have a general goal of calculating a route to a final destination, yet the interactions may occur in many different ways, where a given interaction will likely be highly dependent on context, shared knowledge, agent adaptation, points of origin and/or presence, user preferences, dynamic data (e.g., relating to traffic, events, external systems, etc.), among many other factors.

Accordingly, as further described herein, the method illustrated in FIG. 5 may enable voice destination entry through successive refinement using the aforementioned factors, among other things, to inform route calculation based on full, or partial destination inputs. For instance, in similar fashion as described in the above cab driver example, the voice user interface (e.g., the cab driver) may have knowledge that certain routes may be preferable to reach a certain destination from a current point of presence (e.g., Arlington to Foggy Bottom via Rock Creek Parkway). Further, as will be described in greater detail in FIG. 6, a search space associated with subsequent interactions may be constrained according to a current route, context, or other knowledge (e.g., locations named "McFadden's" that fall outside a certain proximity of Foggy Bottom may be excluded).

Thus, in an operation 510, a user may provide a full or partial destination input using free form natural language, for example, including voice commands and/or multi-modal commands (e.g., an input may include an utterance of "I'm going here," coupled with a touched point on a display). The full or partial destination may be specified in various ways, including by specific address, place name, person's name, business name, neighborhood, city, region, or various other ways (e.g., a voice destination entry may be provided in an exploratory manner, such as when a user wants to visit a museum, but has yet to decide which one to visit). Furthermore, because successive refinement tolerates incomplete or partial addresses, voice destination inputs may be provided in a way that uses the successive refinement in reverse, for example, by narrowly specifying a desired destination in order to calculate a route to a broader vicinity of the desired destination (e.g., a route to South Philadelphia could be identified through an utterance of "Pat's Steaks in Philly," even though Pat's Steaks may not be a user's actual destination).

The voice destination input may be parsed or otherwise analyzed using one or more dynamically adaptable recognition grammars, for example, as described above in reference to FIG. 3. For example, recognition grammars may be loaded, generated, extended, pruned, or otherwise adapted based on various factors, including a proximity to a user's point of presence (e.g., as the user moves from one area to another, the recognition grammar may be optimized based on a current location, a direction of travel, temporal constraints, etc.), a contextual history (e.g., as the user interacts with the voice user interface, the grammar may adapt based on dictionaries, keywords, concepts, or other information associated with other contexts, domains, devices, applications, etc.), or other factors, as will be apparent. As such, an operation 520 may include generating one or more interpretations of the voice destination input, which may be analyzed using various data sources in order to generate an N-best list of possible destinations (e.g., a navigation agent may query a directory, a voice search engine, or other components to identify one or more destinations that at least partially match criteria contained in the voice destination input).

The generated list of possible destinations may be post-processed in an operation 530 in order to assign weights or ranks to one or more of the entries in the N-best list. The post-processing may include analyzing the destination list generated in operation 520 according to various factors in order to determine a most likely intended destination from a full or partial voice destination input. For example, post-processing operation 530 may rank or weigh possible destinations according to shared knowledge about the user, domain-specific knowledge, dialogue history, or other factors. Furthermore, the post-processing operation 530 may analyze the full or partial destination input in order to identify an address to which a route can be calculated, for example, by resolving a closest address that makes "sense" relative to the input destination. For example, a user may specify a partial destination that identifies a broad and approximated area (e.g., "Take me to Massachusetts"), and depending on a user's current location, direction of travel, preferences, or other information, post-processing operation 530 may select an address makes sense for calculating a route (e.g., an address in Cape Cod may be selected for a user having relatives that live in Cape Cod, whereas an address in Boston may be selected for a user who may be traveling to various popular sightseeing areas, etc.).

As a result, the weighed list of N-best destinations may be evaluated in an operation 540 to determine a suitably identifiable destination exists in the list. For example, a full or partial voice destination entry may be ambiguous, or certain criteria or keywords in a voice destination entry may be unrecognizable, such that a highest ranked destination in the weighted list does not exceed a minimal confidence level needed to identify a destination. For instance, a user located in Oklahoma may utter a partial destination, as in "I'm heading to Washington," and the decisional operation 540 may return a negative indication when the voice user interface cannot disambiguate between Washington state, Washington, D.C., Washington University in Saint Louis, and a town of Washington located slightly south of Oklahoma City. In another example, a user originating in Saint Louis may provide a voice destination entry of "Take me to Springfield," which could result in an unidentifiable destination even though multiple destinations may satisfy the minimal confidence level. In this example, "Springfield" may be unidentifiable as a destination because Springfield, Ill. and Springfield, Mo. both reside within reasonable distances of Saint Louis, yet directions of travel to either destination may be entirely opposite (e.g., a route to the Illinois Springfield includes traveling north on Interstate-55, whereas a route to the Missouri Springfield includes traveling southwest on Interstate-44). Thus, to avoid routing the user in a direction opposite from an intended destination, processing may instead branch to an operation 550 to generate a prompt for resolving the destination.

For example, the prompt may ask the user a question or provide information that can clarify an intended meaning of the received voice destination input. For instance, in the Washington example given above, a multi-modal user prompt may display the four possible destinations on a display device (i.e., Washington state, Washington, D.C., Washington University, and Washington, Oklahoma). The multi-modal prompt may further include system-generated speech, for example, stating, "I found several possible Washingtons, did you mean one of these or something else?" As a result, processing then proceeds back to operation 510, in which the user can disambiguate the intended destination through another input (e.g., by touching one of the displayed destinations when the display device includes a touch-screen, or by verbalizing one of the destinations, or by providing additional information indicating that none of the displayed destinations were intended). Thereafter, subsequent N-best lists may be more likely to result in an identifiable destination, as an original voice destination input can be interpreted in view of a dialogue history.

Alternatively, when at least one of the possible destinations can be identified unambiguously, while meeting the minimal confidence level, a positive indication may result in processing proceeding to another decisional operation 560, which controls how a route will be calculated to the identified destination (e.g., a highest ranking entry in the weighted N-best list of destinations). The decisional operation 560 may determine whether the identified destination provides a full or otherwise complete destination. For example, through successive refinement, a partial voice destination entry may result in an identifiable, yet incomplete, destination. As such, an operation 570 may calculate a preliminary route to the identified partial destination. Thereafter, subsequent processing returns to operation 510, where the voice user interface may await an additional voice destination input that refines the partial destination. Further, in various implementations, one or more system prompts may be generated to request the additional voice destination inputs (e.g., as the user approaches the partial destination and additional information will be needed to provide further routing, or as the user approaches a point in the preliminary route where distinct routes may be taken to different topographical subtiles or points within the partial destination, etc.).

As such, the processing operations 510-570 may be iteratively repeated until the final destination can be identified through successive refinement using one or more multi-modal voice destination entries. As a result, when a suitable final destination has been identified, operation 560 may be followed by an operation 580 that completes the route to the final destination. For example, the route may be completed by extrapolating the route to the partial destination into a complete route to the final destination. Further, it will be apparent that voice destination entries may be successively refined into a final destination en route (e.g., the final destination may be successively refined as a user proceeds along a preliminary route), in advance (e.g., the user may choose to drive upon a complete route to a final destination being identified), or in other ways.

Figure 6:
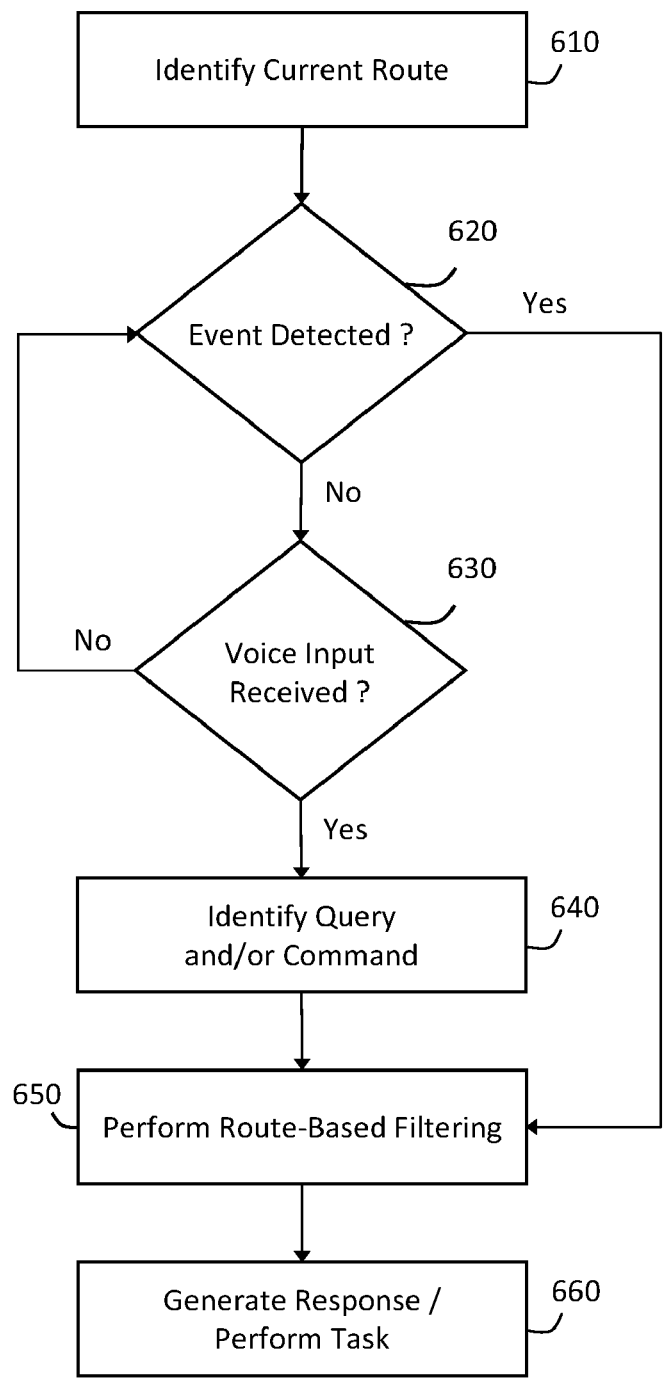
FIG. 6 illustrates a flow diagram of an exemplary method for providing voice services based on a current navigation route according to various aspects of the invention.

Moreover, as described in greater detail herein, the calculated route may be dynamically adjusted or rerouted based on subsequent inputs, generated inferences, dynamic data, or various other sources of information (e.g., inferences may be generated, which may result in dynamic routing, in response to dynamic data relating to traffic conditions, detours, events, weather conditions, or user preferences, or other factors). Thus, FIG. 6 illustrates a flow diagram of an exemplary method for providing voice services based on a current navigation route according to various aspects of the invention. The voice user interface may use the method illustrated in FIG. 6 to provide the voice services in a dynamic, data-driven manner, wherein the voice services may be provided in a customized manner, for example, based on context, shared knowledge about a user, or other sources of information.

Accordingly, providing voice navigation services based on a current route includes identifying the current navigation route in an operation 610. The route may be identified from a preliminary route or a complete route, as calculated according to the techniques described above in reference to FIG. 5. Thus, current routing information may be made available to various system components in order to process events or voice inputs, generate responses, formulate queries, resolve commands, or perform other processing services available in a voice navigation services environment. As such, the current routing information may provide further context relevant to interpreting voice inputs, taking action towards resolving the inputs, or responding to events, among other things. Thus, though not illustrated in FIG. 6, various other sources of contextual information may be utilized to provide voice navigation services in view of the current route. For example, user preferences may limit places to which a vehicle can travel, or for how long the vehicle can travel, among other things (e.g., for keeping a delivery or passenger route on a regular route, or for placing parental controls on teenage drivers, etc.). In another example, the voice user interface may have awareness of one or more external systems or devices, sources of dynamic data, or other information, which can be utilized to determine how to best provide the voice navigation services.

Thus, upon identifying the current route in operation 610, along with other appropriate information relating to context, shared knowledge, or otherwise, a decisional operation 620 may determine whether the identified information results in an event being generated and/or detected. When no event can be generated and/or detected, processing proceeds to a decisional operation 630, which determines whether a voice input has been received from the user. As such, the method illustrated herein may loop through decisional operations 620 and 630 until one or more of an event has been detected and/or a voice input has been received.

One type of event that can be detected and/or generated in decisional operation 620 may relate to location dependent advertisements for navigation systems (e.g., as generated by a local or remote advertising engine, or via a data channel, or in other ways). For example, in various implementations, the advertising events may be generated and/or detected using techniques described in U.S. patent application Ser. No. 11/671,526, entitled "System and Method for Selecting and Presenting Advertisements Based on Natural Language Processing of Voice-Based Input," which issued as U.S. Pat. No. 7,818,176 on Oct. 19, 2010, the contents of which are hereby incorporated by reference in their entirety. For instance, as will be apparent, a navigation system will necessarily include one or more systems or mechanisms for determining the navigation system's current location (e.g., a global positioning system, a radio frequency identification system, a system that determines location based on a distance to an identifiable wireless tower or access point, etc.). Further, the natural language voice user interface may be able to determine location in a number of other ways, in addition to or apart from the location detection system (e.g., an adaptable prompt may affirmatively request the location information from a user, for example, upon failure of the location detection system, or other techniques utilizing shared knowledge or context may be used, as will be apparent).

Thus, in one example, operation 620 may include detecting and/or generating events relating to a location dependent advertisement. A marketer or other entity seeking to reach a target audience may simply scatter radio frequency identifiers (RFIDs) along a roadside, or another place in which a system may detect the RFIDs. The marketer or other entity may then broadcast one or more advertisements via a data channel associated with the RFIDs, such that the navigation system may trigger an event when within a suitable proximity of the RFIDs. Thus, processing would proceed to an operation 570, in which information associated with the event may be filtered according to the current routing information or other contextual parameters. As applied to this example, the filtering operation 650 may include monitoring the data channel to analyze information associated with the detected RFID, thus receiving the advertisements broadcasted over the data channel. Thus, an advertisement including speech, for example, may be analyzed in a similar manner to how user speech would be analyzed (e.g., maintaining awareness that the speech relates to an advertisement).

Accordingly, the advertisement event data may be filtered in view of the current route, personal information (e.g., previous queries, preferences, history, etc.), or other factors to determine what action should be taken in an operation 660. For example, the advertisement may be associated with a local restaurant seeking to reach personal navigation devices that may not necessarily have a complete business database. Therefore, in one example, filtering operation 650 could discard the advertisement when shared knowledge indicates that the user prefers to reach destinations as fast as possible, without making unnecessary stops. In this case, operation 660 may effectively be a null operation, or may simply include displaying an image associated with the advertisement to allow the user to make an independent choice as to whether or not to stop. However, in a distinct example, the user may have provided a previous voice input indicating a desire to stop driving and eat lunch at some point along the route. Thus, in this example, operation 660 may include a spoken output that brings the restaurant to the user's attention, possibly asking the user whether the route should be temporarily diverted to stop for lunch at the restaurant.

However, it should be appreciated that the above described RFID-based advertisement provides but one example of a possible advertising event that may be detected in operation 620. For instance, advertisements may be uploaded to a server by one or more advertising partners, wherein the uploaded advertisements may be associated with metadata or other descriptive information that identifies a target audience, location-dependent information, or other criteria. In another example, a plurality of advertisements may be stored locally at the voice user interface, and an inferencing engine may determine appropriate circumstances in which an event should be generated to deliver one or more of the advertisements to a user. As a result, it will be apparent that advertising events may be generated in a number of ways, and may be generated and/or detected locally, remotely, by detecting RFIDs, or in other ways.

Further, as advertisements get delivered to users (e.g., in operation 660), the users' subsequent interaction with the delivered advertisements may be tracked. In this way, affinity based models may be generated, for example, to ensure that promotions or advertisements will be delivered to a likely target audience. Thus, an event relating to a given advertisement may be generated and/or detected in operation 620 when shared knowledge about a user's behavior, preferences, or other characteristics match one or more criteria associated with peer-to-peer affinities associated with the advertisement. For example, a marketer may be offering promotional coupons intended for a specific demographic audience, and the peer-to-peer affinities may be used to ensure that the coupons will only be provided to, users likely to be in the intended audience (e.g., to avoid providing an entire market, including unlikely customers, with the coupons). Thus, when the user falls within the specified demographic audience, one or more events may be generated on a server, locally by an advertising engine, or in other ways to deliver one or more of the promotional coupons to the user.

In other examples, the advertising model may include mobile pay-per-use systems (e.g., network access may be provided through a wireless access point on a pay-per-use basis), peer-to-peer local guides or recommendations (e.g., affinities may indicate that various categories of peer users may be interested in similar points-of-interests, events, local restaurants, stores, activities, tourist attractions, or other aspects of a local area). Additionally, as described in greater detail above in reference to FIG. 3, various aspects of the advertising model, such as the local guides and recommendations, may be generated according to a mapping applied to various topological domains. For example, local guides or recommendations may be dependent on topological characteristics (e.g., different guides for various cities, communities, localities, etc.). As such, the local guides, recommendations, or other aspects of the advertising model may be associated with a topological taxonomy based on geographical chunking. As a result, various advertising events may be generated and/or detected according to physical proximities, temporal proximities, directional proximities, civil organization proximities, or various combinations thereof (e.g., peer-to-peer recommendations may be varied depending on a user's location, direction of travel, temporal constraints, etc.).

In addition to the advertising related events that can be generated and/or detected in operation 620, the natural language voice user interface may generate additional events through awareness of context, shared knowledge about a user, external systems and devices, or other information. For example, as discussed above in reference to FIG. 2, the voice user interface may implemented within an agent-based architecture, in which one or more of a plurality of agents may include an inference engine. However, it will be apparent that the inference engine may be arranged within the voice user interface in various other ways. For example, the voice user interface may include the inference engine within a conversational language processor, where in such implementations, the inference engine may generate, detect, and distribute events to various components of the voice user interface. In another example, a managing inference engine may coordinate event generation and/or detection among the inference engines associated with the agents. As such, it will be apparent that the voice user interface may include various suitable arrangements of one or more inference engines, such that events and inferences can be detected, generated, and distributed to various system components as they may arise.

Thus, the one or more inference engines may utilize awareness of context, shared knowledge about a user, dynamic data sources, data and services associated with external or devices, among other information to generate and/or detect the events or other inferences identified in operation 620. When the events or other inferences occur when a current navigation route exists, the events or other inferences may be filtered in operation 650 prior to being a response being generated and/or a task being performed in operation 660.

For example, the inference engine may utilize personal information, such as a user frequently visiting a particular person in the user's address book, to generate an event that suggests rerouting the current route. Thus, in this example, the inference engine may generate the event (which may be detected in operation 620) when the current route or current location information reflects a certain proximity to an address associated with the person in the address book. Operation 650 could then filter the event by determining possible responses or courses of action for handling the event in a manner consistent with the current route. For example, information associated with the current route may indicate that the user was out running errands and may now be heading home. Further, a calendar in the user's address book may indicate that the user has an appointment later in the day, but that no calendar entries exist for a few hours. Thus, an exemplary response generated in operation 660 may include a speech-based output of, "You are close to Jane's house, would you like to stop by?"

Although the above-provided example illustrates an event generated using personal information, it will be apparent that various available information sources may be utilized to generate and/or detect events. For example, events may be based on transient or dynamic data relating to communities, traffic, weather, and/or many other sources of data (e.g., a generated event may result in an output of "Tonight's soccer game is being played at a field near your house, do you want to go?", in which the soccer game may be a local community event).

In yet another example, various types of external system awareness may trigger events and resulting voice responses from the voice user interface. For example, the voice user interface may be coupled to various vehicular or telematics systems, providing awareness over a state of such systems. Thus, an event may be generated when the vehicular system indicates that the vehicle will soon run out of gas, resulting in a voice response prompting a user to stop for gas. Further, the external system awareness may be filtered according to the current routing information (e.g., in conjunction with the inference engine), wherein a calculation may be made indicating that a level of gas will be sufficient to get to a next gas station along the route, but that the level of gas will not be sufficient to get to a second gas station along the route. As a result, the route-based filtering operation 650 may result in a response being generated in operation 660 that provides a voice warning that the user must stop for gas at the next gas station.

Returning to operation 630, user-provided voice inputs may also be processed in view of current routing information. As previously discussed, interpretations of what was said in a voice input (e.g., content of an utterance) may be based on various phonetic models, dictionaries, context histories, dialogue histories, and other information that can form a dynamic recognition grammar. Moreover, context, shared knowledge, and available data and services, among other information, may be used to interpret what meant by the voice input (e.g., an intent of the utterance). As a result, using the various techniques described herein and in the incorporated U.S. Patent Applications and issued U.S. Patents, a query, command, or other request contained in the utterance may be identified in an operation 640. When a current route exists, a domain of possible tasks, commands, query answers, responses, and/or other system actions may be filtered according to the current route. For example, a voice input of "Where's the closest bathroom" may be analyzed in view of the current route. Various proximities (e.g., a direction of travel, physical distances, temporal distances, etc.) may then be utilized to determine what bathrooms may be appropriate in view of the current route. Thus, when a route has the user traveling a long distance, for example, a bathroom at a rest area twenty miles ahead may be favored over a bathroom at a restaurant ten miles off a highway (e.g., to avoid diverting the user from the current route).

Furthermore, in many instances, an agent or other processing component may need to formulate a plurality of queries to various different data sources in order to resolve a request. As such, operation 660 for performing a task may determine what inferences, metadata, or other information may be needed to formulate queries to the data sources in order to resolve the request. As a result, voice requests relating to navigation may include information that may not necessarily be linked to navigation, or that may not necessarily be in a database or other source of navigation information. Even so, by being coupled with various available sources of information, complex or compound queries may be formulated to retrieve information from various data sources in order to resolve a given request. Furthermore, a given utterance may include multiple requests, queries, or commands, such that a given response or task performed in response to the utterance may include interactions with various different system components. Thus, in an illustrative example, an utterance of "Find the 7-11 closest to the Woodland Park Zoo" may include a first query to identify a location of Woodland Park Zoo, a second query to find one or more 7-11's within a certain radius of the Woodland Park Zoo location, a third query to determine a current location of the user, and a fourth query that invokes an inference engine to determine which 7-11 may be "closest" based on various user proximities. Thus, supposing that two 7-11's exist equidistantly from the Woodland Park Zoo, one in a direction east of the Zoo and one in a direction west of the Zoo, the user's current location may be used to determine which 7-11 to select; by contrast, a selection based purely on physical proximity to the Zoo could result in ambiguity.

Although the above-provided descriptions highlight various specific examples and illustrations of how the natural language voice user interface may provide voice navigation services, it will be understood that the descriptions, examples, and modes of operation provided above should be regarded as exemplary only. The natural language voice user interface may be highly tolerant of variations in how humans interact verbally, and may utilize context, shared knowledge, and available data and systems to effectively interact with any given user in a conversational manner that advances mutual goals. As a result, interactions between the user and the voice user interface may be regarded as unique occurrences, as users may speak free form requests relating to various available data sources, applications, or devices in a given interaction. Thus, the voice user interface may dynamically adapt, learn, and otherwise refine an operational framework to provide optimal services in the voice navigation services environment.

Implementations of the invention may be made in hardware, firmware, software, or various combinations thereof. The invention may also be implemented as instructions stored on a machine-readable medium, which may be read and executed by one or more processors. A machine-readable medium may include a mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that one skilled in the art may be able to effect such feature, structure, or characteristic in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method for dynamically generating a recognition grammar in an integrated voice navigation services environment, comprising:
   receiving a natural language utterance from an input device coupled to a navigation device, wherein the natural language utterance relates to a navigation context;
   identifying a current location associated with the navigation device using a location detection system coupled to the navigation device;
   generating, at a conversational language processor, a dynamic recognition grammar that organizes grammar information based on one or more topological domains associated with the current location associated with the navigation device; and
   determining one or more affinities between a user that spoke the natural language utterance and one or more peers associated with the user, wherein the dynamic recognition grammar further organizes the grammar information according to the one or more determined affinities;
   generating, at a speech recognition engine, one or more interpretations associated with the natural language utterance using the dynamic recognition grammar.

2. The method of claim 1, wherein generating the dynamic recognition grammar includes:
   recognizing, at a multi-pass speech recognition module associated with the speech recognition engine, one or more command words in the natural language utterance that define a command in the navigation context;
   recognizing, at the multi-pass speech recognition module, one or more location words in the natural language utterance that define a state associated with the command in the navigation context; wherein the dynamic recognition grammar further organizes the grammar information according to the state associated with the command in the navigation context; and
   recognizing, at the multi-pass speech recognition module, one or more additional location words in the natural language utterance that define a city within the state associated with the command in the navigation context, wherein the dynamic recognition grammar further organizes the grammar information according to multiple street addresses in the city within the state associated with the command in the navigation context.

3. The method of claim 2, wherein generating the one or more interpretations associated with the natural language utterance using the dynamic recognition grammar includes:
   recognizing, at the speech recognition engine, one or more additional command words in the natural language utterance using the grammar information organized according to the multiple street addresses in the city within the state associated with the command in the navigation context, wherein the one or more additional command words define one or more of the multiple street addresses; and
   combining the one or more command words and the one or more additional command words recognized in the natural language utterance to generate the one or more interpretations associated with the natural language utterance.

4. The method of claim 1, wherein the one or more topological domains include a state mapped to the current location associated with the navigation device and generating the dynamic recognition grammar includes:
   recognizing, at a multi-pass speech recognition module associated with the speech recognition engine, one or more command words in the natural language utterance that define a command in the navigation context; and recognizing, at the multi-pass speech recognition module, one or more location words in the natural language utterance that define a city within the state mapped to the current location associated with the navigation device, wherein the dynamic recognition grammar further organizes the grammar information according to multiple street addresses in the city within the state mapped to the current location associated with the navigation device.

5. The method of claim 4, wherein generating the one or more interpretations associated with the natural language utterance using the dynamic recognition grammar includes:

recognizing, at the speech recognition engine, one or more additional command words in the natural language utterance using the grammar information organized according to the multiple street addresses in the city within the state mapped to the current location associated with the navigation device, wherein the one or more additional command words define one or more of the multiple street addresses; and combining the one or more command words and the one or more additional command words recognized in the natural language utterance to generate the one or more interpretations associated with the natural language utterance.

6. The method of claim 1, wherein the dynamic recognition grammar has a size constrained according to memory or resources available to the navigation device via the integrated voice navigation services environment.

7. The method of claim 1, further comprising modifying the grammar information in the dynamic recognition grammar in response to one or more changes to the one or more topological domains associated with the current location associated with the navigation device.

8. The method of claim 1, wherein the dynamic recognition grammar organizes the grammar information according to geographic chunks based on the one or more topological domains associated with the current location associated with the navigation device.

9. The method of claim 8, further comprising dividing the geographic chunks into multiple tiles, wherein the dynamic recognition grammar further organizes the grammar information according to the multiple tiles associated with the divided geographic chunks.

10. The method of claim 9, further comprising dividing one or more of the multiple tiles into multiple subtiles, wherein the dynamic recognition grammar further organizes the grammar information according to the multiple subtiles associated with the divided one or more of the multiple tiles.

11. The method of claim 8, wherein the geographic chunks include physical proximities that relate to a distance from the current location associated with the navigation device, temporal proximities that relate to a travel time from the current location associated with the navigation device, directional proximities that relate to a directional travel vector from the current location associated with the navigation device, or civil organizational proximities that relate to continents, countries, regions, states, cities, localities, neighborhoods, or communities mapped to the current location associated with the navigation device.

12. A system for dynamically generating a recognition grammar in an integrated voice navigation services environment, comprising:

an input device configured to receive a natural language utterance, wherein the natural language utterance relates to a navigation context;

a location detection system configured to identify a current location associated with a navigation device;

a conversational language processor configured to generate a dynamic recognition grammar that organizes grammar information based on one or more topological domains associated with the current location associated with the navigation device and configured to determine one or more affinities between a user that spoke the natural language utterance and one or more peers associated with the user, wherein the dynamic recognition grammar further organizes the grammar information according to the one or more determined affinities; and a speech recognition engine configured to generate one or more interpretations associated with the natural language utterance using the dynamic recognition grammar.

13. The system of claim 12, further comprising a multi-pass speech recognition module configured to:

recognize one or more command words in the natural language utterance that define a command in the navigation context;

recognize one or more location words in the natural language utterance that define a state associated with the command in the navigation context, wherein the dynamic recognition grammar further organizes the grammar information according to the state associated with the command in the navigation context; and recognize one or more additional location words in the natural language utterance that define a city within the state associated with the command in the navigation context, wherein the dynamic recognition grammar further organizes the grammar information according to multiple street addresses in the city within the state associated with the command in the navigation context.

14. The system of claim 13, wherein to generate the one or more interpretations associated with the natural language utterance using the dynamic recognition grammar, the speech recognition engine is further configured to:

recognize one or more additional command words in the natural language utterance using the grammar information organized according to the multiple street addresses in the city within the state associated with the command in the navigation context, wherein the one or more additional command words define one or more of the multiple street addresses; and combine the one or more command words and the one or more additional command words recognized in the natural language utterance to generate the one or more interpretations associated with the natural language utterance.

15. The system of claim 12, wherein the one or more topological domains include a state mapped to the current location associated with the navigation device, and wherein the system further comprises a multi-pass speech recognition module configured to:

recognize one or more command words in the natural language utterance that define a command in the navigation context; and recognize one or more location words in the natural language utterance that define a city within the state mapped to the current location associated with the navigation device, wherein the dynamic recognition grammar further organizes the grammar information according to multiple street addresses in the city within the state mapped to the current location associated with the navigation device.

16. The system of claim 15, wherein to generate the one or more interpretations associated with the natural language utterance using the dynamic recognition grammar, the speech recognition engine is further configured to:
 recognize one or more additional command words in the natural language utterance using the grammar information organized according to the multiple street addresses in the city within the state mapped to the current location associated with the navigation device, wherein the one or more additional command words define one or more of the multiple street addresses; and
 combine the one or more command words and the one or more additional command words recognized in the natural language utterance to generate the one or more interpretations associated with the natural language utterance.

17. The system of claim 12, wherein the dynamic recognition grammar has a size constrained according to memory or resources available to the navigation device via the integrated voice navigation services environment.

18. The system of claim 12, wherein the conversational language processor is further configured to modify the grammar information in the dynamic recognition grammar in response to one or more changes to the one or more topological domains associated with the current location associated with the navigation device.

19. The system of claim 12, wherein the dynamic recognition grammar organizes the grammar information according to geographic chunks based on the one or more topological domains associated with the current location associated with the navigation device.

20. The system of claim 19, wherein the conversational language processor is further configured to divide the geographic chunks into multiple tiles, wherein the dynamic recognition grammar further organizes the grammar information according to the multiple tiles associated with the divided geographic chunks.

21. The system of claim 20, wherein the conversational language processor is further configured to divide one or more of the multiple tiles into multiple subtiles, wherein the dynamic recognition grammar further organizes the grammar information according to the multiple subtiles associated with the divided one or more of the multiple tiles.

22. The system of claim 19, wherein the geographic chunks include physical proximities that relate to a distance from the current location associated with the navigation device, temporal proximities that relate to a travel time from the current location associated with the navigation device, directional proximities that relate to a directional travel vector from the current location associated with the navigation device, or civil organizational proximities that relate to continents, countries, regions, states, cities, localities, neighborhoods, or communities mapped to the current location associated with the navigation device.

23. A navigation device for dynamically generating a recognition grammar in an integrated voice navigation services environment, wherein the navigation device comprises one or more processors configured to:
 receive a natural language utterance that relates to a navigation context;
 identify a current location associated with the navigation device;
 generate a dynamic recognition grammar that organizes grammar information based on one or more topological domains associated with the current location associated with the navigation device; and
 determine one or more affinities between a user that spoke the natural language utterance and one or more peers associated with the user, wherein the dynamic recognition grammar further organizes the grammar information according to the one or more determined affinities
 generate one or more interpretations associated with the natural language utterance using the dynamic recognition grammar.

24. The navigation device of claim 23, wherein the one or more processors are further configured to:
 recognize one or more command words in the natural language utterance that define a command in the navigation context;
 recognize one or more location words in the natural language utterance that define a state associated with the command in the navigation context, wherein the dynamic recognition grammar further organizes the grammar information according to the state associated with the command in the navigation context; and
 recognize one or more additional location words in the natural language utterance that define a city within the state associated with the command in the navigation context, wherein the dynamic recognition grammar further organizes the grammar information according to multiple street addresses in the city within the state associated with the command in the navigation context.

25. The navigation device of claim 24, wherein to generate the one or more interpretations associated with the natural language utterance using the dynamic recognition grammar, the one or more processors are further configured to:
 recognize one or more additional command words in the natural language utterance using the grammar information organized according to the multiple street addresses in the city within the state associated with the command in the navigation context, wherein the one or more additional command words define one or more of the multiple street addresses; and
 combine the one or more command words and the one or more additional command words recognized in the natural language utterance to generate the one or more interpretations associated with the natural language utterance.

26. The navigation device of claim 23, wherein the one or more topological domains include a state mapped to the current location associated with the navigation device and the one or more processors are further configured to:
 recognize one or more command words in the natural language utterance that, define a command in the navigation context; and
 recognize one or more location words in the natural language utterance that define a city within the state mapped to the current location associated with the navigation device, wherein the dynamic recognition grammar further organizes the grammar information according to multiple street addresses in the city within the state mapped to the current location associated with the navigation device.

27. The navigation device of claim 26, wherein to generate the one or more interpretations associated with the natural language utterance using the dynamic recognition grammar, the one or more processors are further configured to:
 recognize one or more additional command words in the natural language utterance using the grammar information organized according to the multiple street addresses in the city within the state mapped to the current location associated with the navigation device, wherein the one or more additional command words define one or more of the multiple street addresses; and combine the one or more command words and the one or more additional command words recognized in the natural language utterance to generate the one or more interpretations associated with the natural language utterance.

28. The navigation device of claim 23, wherein the dynamic recognition grammar has a size constrained according to memory or resources available to the navigation device via the integrated voice navigation services environment.

29. The navigation device of claim 23, wherein the conversational language processor is further configured to modify the grammar information in the dynamic recognition grammar in response to one or more changes to the one or more topological domains associated with the current location associated with the navigation device.

30. The navigation device of claim 23, wherein the dynamic recognition grammar organizes the grammar information according to geographic chunks based on the one or more topological domains associated with the current location associated with the navigation device.

31. The navigation device of claim 30, wherein the conversational language processor is further configured to:

divide the geographic chunks into multiple tiles, wherein the dynamic recognition grammar further organizes the grammar information according to the multiple tiles associated with the divided geographic chunks; and divide one or more of the multiple tiles into multiple subtiles, wherein the dynamic recognition grammar further organizes the grammar information according to the multiple subtiles associated with the divided one or more of the multiple tiles.

32. The navigation device of claim 30, wherein the geographic chunks include physical proximities that relate to a distance from the current location associated with the navigation device, temporal proximities that relate to a travel time from the current location associated with the navigation device, directional proximities that relate to a directional travel vector from the current location associated with the navigation device, or civil organizational proximities that relate to continents, countries, regions, states, cities, localities, neighborhoods, or communities mapped to the current location associated with the navigation device.

* * * * *

UNITED STATES PATENT AND TRADEMARK OFFICE
CERTIFICATE OF CORRECTION

PATENT NO. : 8,326,627 B2
APPLICATION NO. : 13/341479
DATED : December 4, 2012
INVENTOR(S) : Michael R. Kennewick et al.

Page 1 of 1

It is certified that error appears in the above-identified patent and that said Letters Patent is hereby corrected as shown below:

On the title page, in Item (75) Inventors, change "Philippe DiChristo" to --Philippe Di Cristo--.

Signed and Sealed this
Seventh Day of May, 2013

Teresa Stanek Rea
*Acting Director of the United States Patent and Trademark Office*